(12) United States Patent
Takahashi et al.

(10) Patent No.: US 8,134,659 B2
(45) Date of Patent: Mar. 13, 2012

(54) ELLIPTICAL POLARIZER AND VERTICAL ALIGNMENT TYPE LIQUID CRYSTAL DISPLAY DEVICE USING THE SAME

(75) Inventors: Yuji Takahashi, Yokohama (JP); Tetsuya Uesaka, Yokohama (JP); Satoru Ikeda, Yokohama (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 0 days.

(21) Appl. No.: 12/994,190

(22) PCT Filed: Apr. 20, 2009

(86) PCT No.: PCT/JP2009/001797
§ 371 (c)(1),
(2), (4) Date: Nov. 23, 2010

(87) PCT Pub. No.: WO2009/150779
PCT Pub. Date: Dec. 17, 2009

(65) Prior Publication Data
US 2011/0063547 A1 Mar. 17, 2011

(30) Foreign Application Priority Data
Jun. 13, 2008 (JP) ................................ 2008-155516

(51) Int. Cl.
*G02F 1/1335* (2006.01)
*G02B 5/30* (2006.01)
(52) U.S. Cl. ................ 349/96; 359/483.01; 359/489.07
(58) Field of Classification Search .............. 359/485.03
See application file for complete search history.

(56) References Cited

U.S. PATENT DOCUMENTS

| | | | |
|---|---|---|---|
| 5,193,020 | A | 3/1993 | Shiozaki et al. |
| 5,413,657 | A | 5/1995 | Yamanashi et al. |
| 5,519,523 | A | 5/1996 | Madokoro et al. |
| 5,699,136 | A | 12/1997 | Arakawa et al. |
| 6,208,396 | B1 | 3/2001 | Shimizu et al. |
| 6,320,634 | B1 | 11/2001 | Winker et al. |
| 6,970,214 | B2 | 11/2005 | Sato et al. |
| 7,732,024 | B2 * | 6/2010 | Mazaki et al. ............. 428/1.3 |

(Continued)

FOREIGN PATENT DOCUMENTS

EP 0 350 383 A2 1/1990
(Continued)

OTHER PUBLICATIONS

Int'l Search Report issued on Jun. 30, 2009 in Int'l Application No. PCT/JP2009/001797.

(Continued)

*Primary Examiner* — Michelle R Connelly Cushwa
(74) *Attorney, Agent, or Firm* — Panitch Schwarze Belisario & Nadel LLP

(57) ABSTRACT

The present invention provides an elliptical polarizer with excellent viewing angle characteristics. The elliptical polarizer comprises at least a first polarizer, a first optically anisotropic layer, a second optically anisotropic layer, and a third optically anisotropic layer, laminated in this order, the first optically anisotropic layer satisfying [1] $50 \leq Re1 \leq 500$, [2] $30 \leq Rth1 \leq 750$, and [3] $0.6 \leq Rth1/Re1 \leq 1.5$, the second optically anisotropic layer satisfying [4] $0 \leq Re2 \leq 20$ and [5] $-500 \leq Rth2 \leq -30$, and the third optically anisotropic layer satisfying [6] $100 \leq Re3 \leq 180$, [7] $50 \leq Rth3 \leq 600$, and [8] $0.5 \leq Rth3/Re3 \leq 3.5$, wherein Re indicates the retardation value in the plane of each optically anisotropic layer and Rth indicates the retardation value in the thickness direction of each optically anisotropic layer.

21 Claims, 6 Drawing Sheets

U.S. PATENT DOCUMENTS

| | | | |
|---|---|---|---|
| 7,880,839 B2 * | 2/2011 | Nakamura | 349/118 |
| 7,898,620 B2 * | 3/2011 | Ikeda et al. | 349/117 |
| 2001/0048497 A1 | 12/2001 | Miyachi et al. | |
| 2005/0225706 A1 | 10/2005 | Miyachi et al. | |
| 2007/0263152 A1 * | 11/2007 | Mazaki et al. | 349/130 |
| 2009/0091691 A1 * | 4/2009 | Sato et al. | 349/96 |
| 2009/0251642 A1 * | 10/2009 | Nakamura et al. | 349/75 |
| 2010/0026936 A1 | 2/2010 | Uesaka et al. | |
| 2010/0085522 A1 * | 4/2010 | Uesaka et al. | 349/119 |
| 2010/0171916 A1 * | 7/2010 | Mazaki et al. | 349/127 |
| 2010/0182544 A1 * | 7/2010 | Ikeda et al. | 349/75 |
| 2010/0309414 A1 * | 12/2010 | Tomonaga et al. | 349/96 |
| 2011/0063547 A1 * | 3/2011 | Takahashi et al. | 349/98 |
| 2011/0116004 A1 * | 5/2011 | Takahashi et al. | 349/61 |

FOREIGN PATENT DOCUMENTS

| | | |
|---|---|---|
| EP | 0 482 620 A2 | 4/1992 |
| EP | 1644439 A1 | 4/2006 |
| JP | 63-239421 A | 10/1988 |
| JP | 02-015239 A | 1/1990 |
| JP | 03-103823 A | 4/1991 |
| JP | 04003001 A | 1/1992 |
| JP | 04-057017 A | 2/1992 |
| JP | 05-080323 A | 4/1993 |
| JP | 05-157911 A | 6/1993 |
| JP | 05-333313 A | 12/1993 |
| JP | 06-214116 | 8/1994 |
| JP | 07261023 A | 10/1995 |
| JP | 07-306406 A | 11/1995 |
| JP | 08278491 A | 10/1996 |
| JP | 10-123506 A | 5/1998 |
| JP | 2000347027 A | 12/2000 |
| JP | 2002-040428 A | 2/2002 |
| JP | 2002-055342 A | 2/2002 |
| JP | 2002214439 A | 7/2002 |
| JP | 2002258269 A | 9/2002 |
| JP | 2003-207782 A | 7/2003 |
| JP | 2005-004096 A | 1/2005 |
| JP | 2005-062668 A | 3/2005 |
| JP | 2005-062672 A | 3/2005 |
| JP | 2005-189633 A | 7/2005 |
| JP | 2005-202101 A | 7/2005 |
| JP | 2006-085203 A | 3/2006 |
| JP | 2006-098946 A | 4/2006 |
| JP | 2008-129175 A | 6/2008 |
| JP | 2008-129176 A | 6/2008 |
| WO | 96/10773 A1 | 4/1996 |
| WO | 01046720 A1 | 6/2001 |

OTHER PUBLICATIONS

U.S. Office Action issued Nov. 30, 2004 in U.S. Appl. No. 10/791,113.

U.S. Appl. No. 12/674,799, filed Feb. 23, 2010.

* cited by examiner

[ Fig. 1 ]
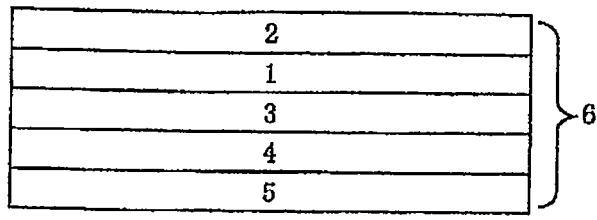
[ Fig. 2 ]
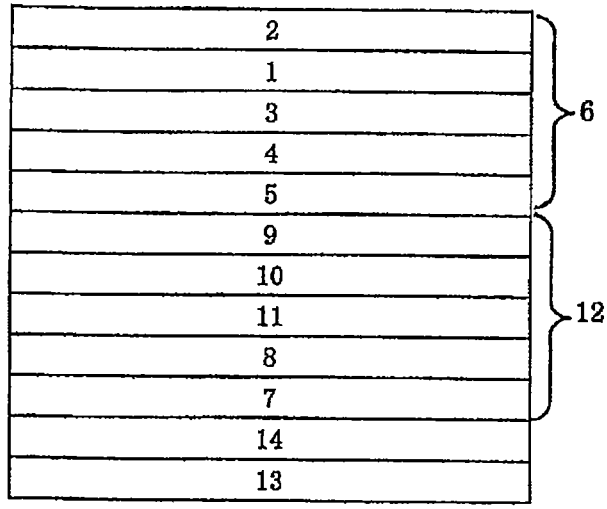
[ Fig. 3 ]
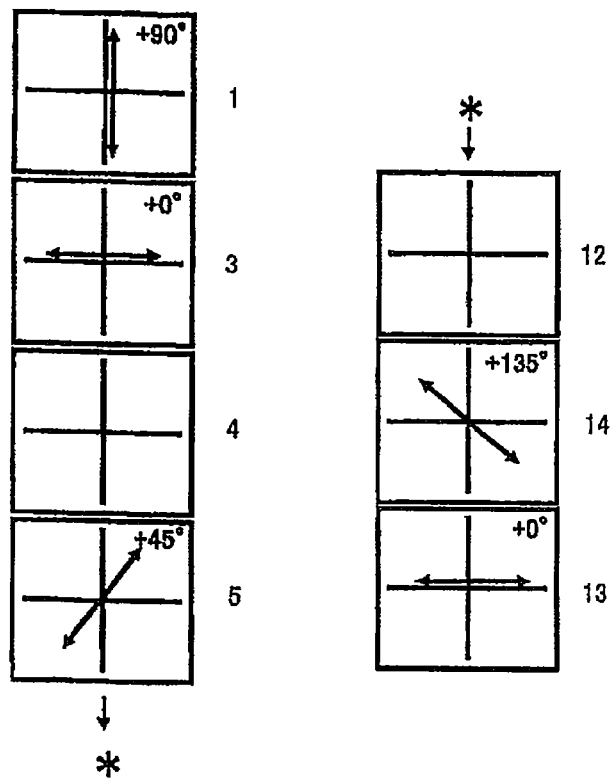

[ Fig. 4 ]
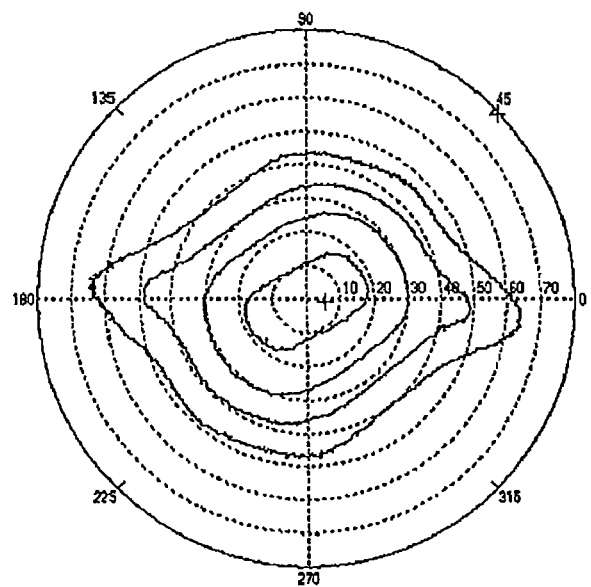
[ Fig. 5 ]
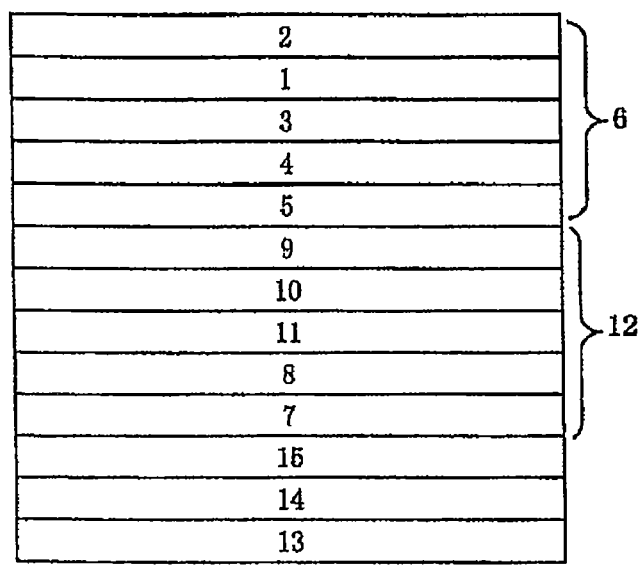

[ Fig. 6 ]
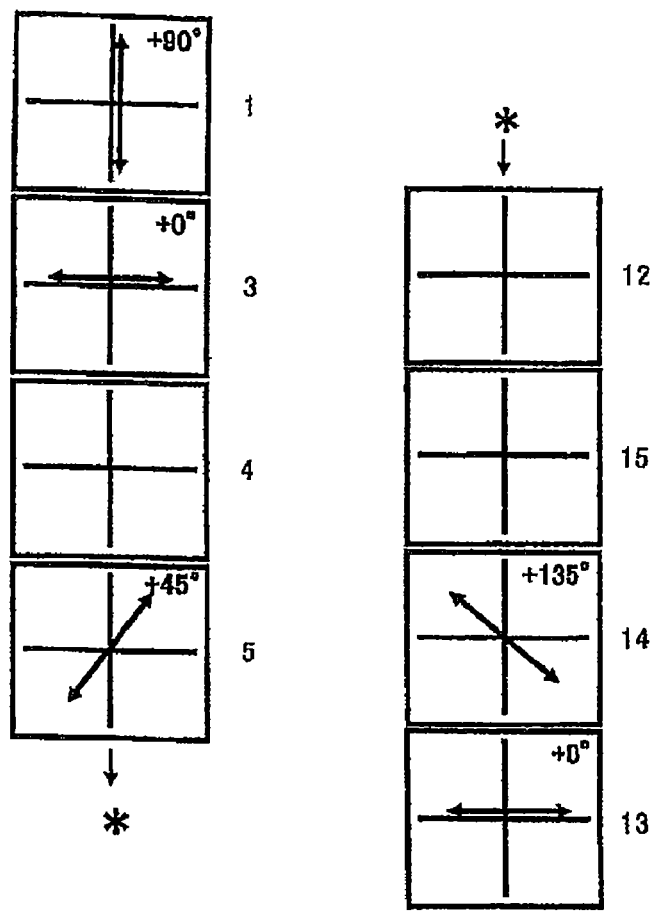
[ Fig. 7 ]
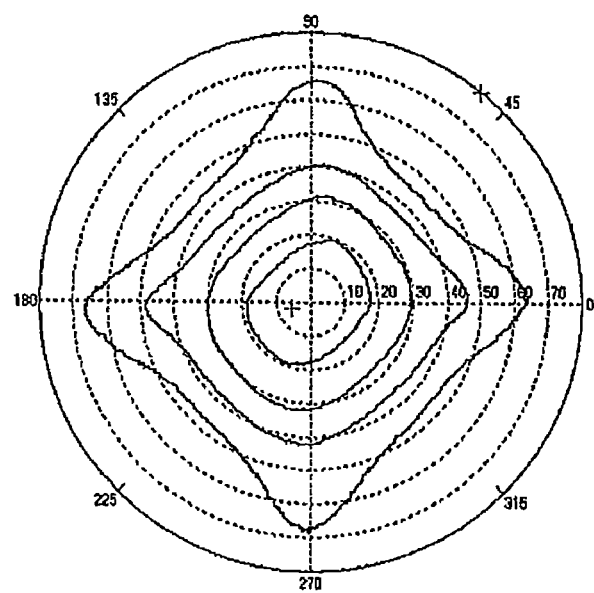

[ Fig. 8 ]
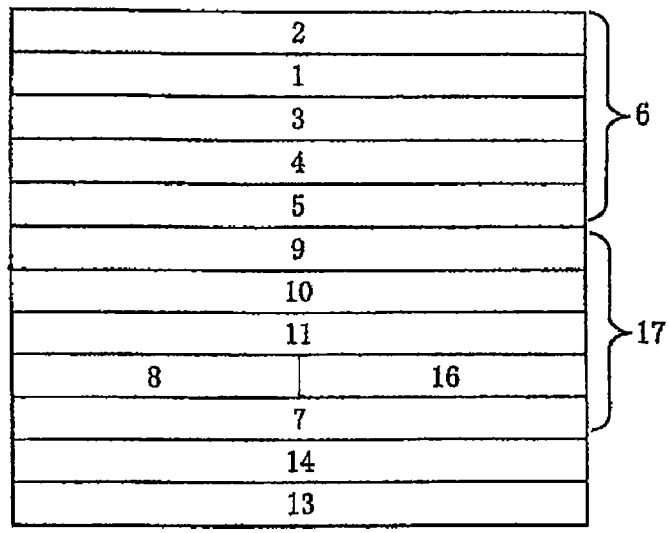
[ Fig. 9 ]
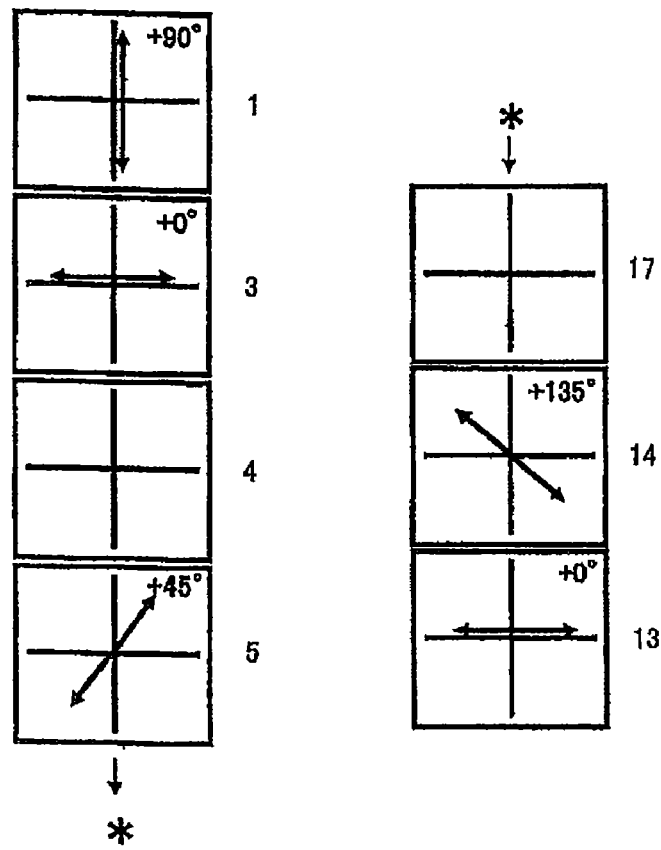

[ Fig. 10 ]
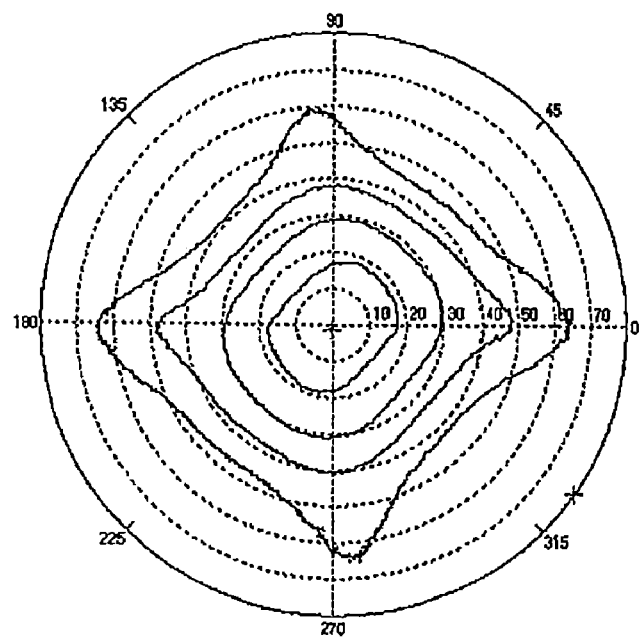
[ Fig. 11 ]
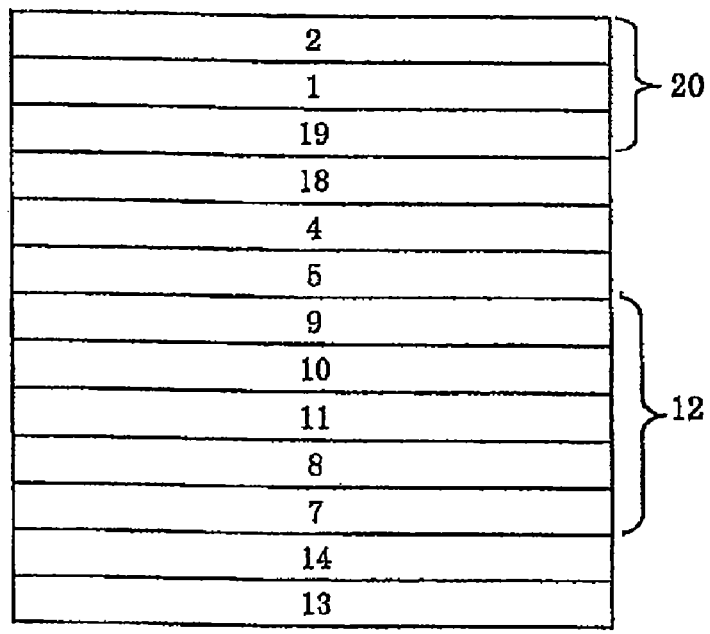

[ Fig. 12 ]
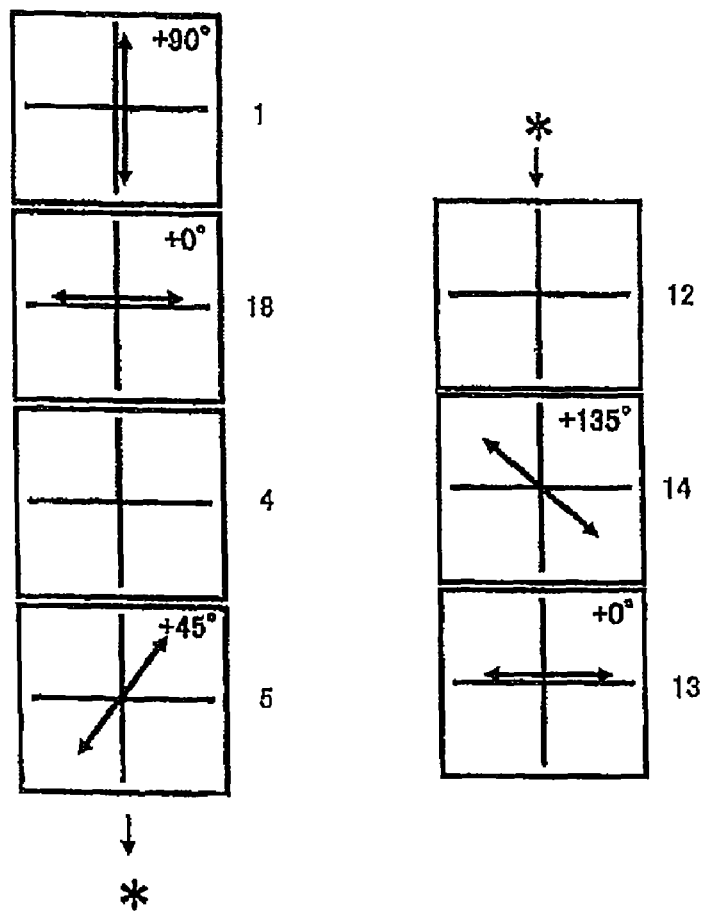
[ Fig. 13 ]
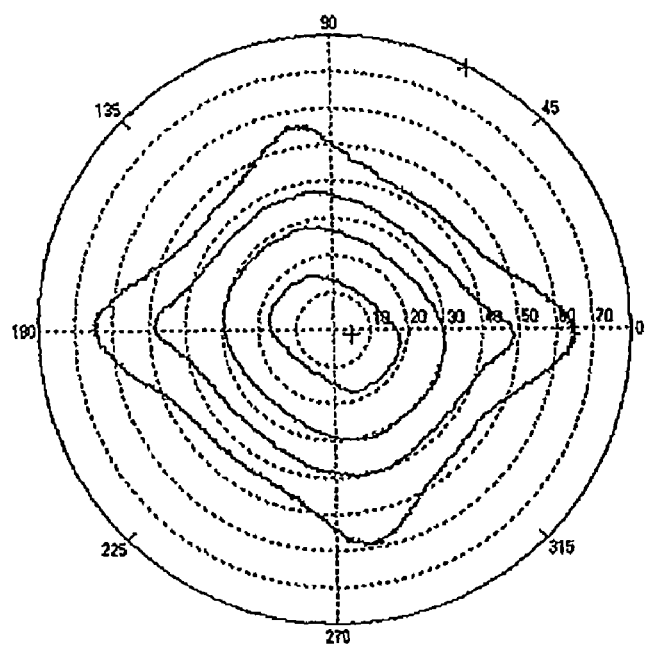

ELLIPTICAL POLARIZER AND VERTICAL ALIGNMENT TYPE LIQUID CRYSTAL DISPLAY DEVICE USING THE SAME

CROSS-REFERENCE TO RELATED APPLICATION

This application is a section 371 of International Application No. PCT/JP2009/001797, filed Apr. 20, 2009, which was published in the Japanese language on Dec. 17, 2009 under International Publication No. WO 2009/150779 A1 and the disclosure of which is incorporated herein by reference.

TECHNICAL FIELD

The present invention relates to elliptical polarizers with excellent viewing angle characteristics and liquid crystal display devices, in particular vertical alignment type liquid crystal display devices where liquid crystal molecules are aligned vertically with respect to the substrates when no electric voltage is applied.

BACKGROUND ART

As one example of the display modes of a liquid crystal display device, there is a vertical alignment mode wherein the liquid crystal molecules in the liquid crystal cell are aligned vertically with respect to the substrates thereof under the initial conditions. When no electric voltage is applied, the liquid crystal molecules are aligned vertically with respect to the substrates. Therefore, a black image is obtained if linear polarizers are arranged on the both sides of the liquid crystal cell perpendicularly to one another.

The optical property in the liquid crystal cell is isotropic in the plane direction, and thus ideal viewing angle compensation is easily achieved. In order to compensate a positive uniaxial anisotropy in the liquid crystal cell thickness direction, an optical element with a negative uniaxial anisotropy in the thickness direction is inserted between one or both surface of the liquid crystal cell and the linear polarizers, resulting in extremely excellent black display viewing angle characteristics.

When an electric voltage is applied, the liquid crystal molecules changes in alignment from the direction vertical to the substrate surfaces toward the direction parallel thereto. Thereupon, it is difficult to align uniformly the liquid crystal molecules. The use of a conventional alignment treatment, i.e., rubbing treatment leads to a significant deterioration in display quality.

In order to align uniformly the liquid crystal molecules when an electric voltage is applied, a proposal was made wherein the shapes of electrodes on the substrate are modified to generate an oblique electric field in the liquid crystal layer. According to this proposal, although a uniform liquid crystal molecule alignment is achieved, nonuniformly aligned regions if viewed microscopically are formed and become dark regions when an electric voltage is applied. Therefore, the liquid crystal display device is decreased in transmissivity.

According to Patent Document 1 below, a proposal was made wherein circular polarizers are replaced for linear polarizers arranged on both sides of an liquid crystal element having a random-aligned liquid crystal layer. The use of circular polarizers each comprising a linear polarizer combined with a ¼ wavelength plate in place of the linear polarizers can eliminate dark regions formed when an electric voltage is applied and accomplish the production of a liquid crystal display device with a higher transmissivity. However, a vertical alignment type liquid crystal display device with circular polarizers has a problem that the viewing angle characteristics are narrower than a vertical alignment type liquid crystal display device with linear polarizers. According to Patent Document 2 below, it is proposed to use an optically anisotropic element with a negative uniaxial anisotropy or a biaxial optically anisotropic material in order to compensate the viewing angle of the vertical alignment type liquid crystal display device with circular polarizers. However, the optically anisotropic element with a negative uniaxial anisotropy can compensate the positive uniaxial optical anisotropy in the liquid crystal cell thickness direction but can not compensate the viewing angle characteristics of a ¼ wavelength plate, resulting in a failure to obtain sufficient viewing angle characteristics. Further, upon production of the biaxial optically anisotropic material, NZ defined as $Nz=(nx-nz)/(nx-ny)$ is $-1.0<Nz<0.1$ wherein nx and ny indicate the main refractive indices in the plane of the resulting optically anisotropic plate, nz indicate the refractive index in the thickness direction, and $nx>ny$. Therefore, there is a limit in stretching in the thickness direction and thus the retardation in the thickness direction cannot be controlled within a wide range. Further, since in the foregoing production method, an elongate film is stretched in the thickness direction by utilizing the heat-contraction of a heat contractive film, the resulting retardation plate becomes thicker than the original elongate film. The thickness of the retardation film produced by the method is from 50 to 100 µm and was insufficient for low profiling required in liquid crystal display devices or the like.

In order to compensate the viewing angle of a vertical alignment type liquid crystal display device with circular polarizers, Patent Documents 3 and 4 below proposes a structure wherein three types of elements such as an optically anisotropic element with a negative uniaxial optical anisotropy for compensating the liquid crystal cell, a compensation layer that is large in refractive index in the thickness direction for compensating the viewing angle of the ¼ wavelength plate and a polarizer compensating film are combined. However, when each of these 3 types of the films are arranged on both sides of the display device, 6 sheets of the films in total are used and further λ/4 plates are used on both sides for imparting a circular polarizer function, resulting in the use of 8 sheets of these films. Therefore, they can significantly improve the viewing angle but are not practical in view of production cost and thickness.

PRIOR ART DOCUMENTS

Patent Documents

Patent Document 1: Japanese Patent Application Laid-Open Publication No. 2002-40428
Patent Document 2: Japanese Patent Application Laid-Open Publication No. 2003-207782
Patent Document 3: Japanese Patent Application Laid-Open Publication No. 2002-55342
Patent Document 4: Japanese Patent Application Laid-Open Publication No. 2006-85203

DISCLOSURE OF INVENTION

Technical Problem

The present invention has an object to provide an elliptical polarizer which is inexpensive and excellent in viewing angle characteristics, for a vertical alignment type liquid crystal display device and a vertical alignment type liquid crystal display device.

Solution to Problem

As the results of the extensive researches and studies, the present invention was accomplished on the basis of the finding that the object was achieved with an elliptical polarizer described below and a vertical alignment type liquid crystal display device equipped with the same.

That is, the present inventions are as follows.

[1] an elliptical polarizer comprising at least a first polarizer, a first optically anisotropic layer, a second optically anisotropic layer, and a third optically anisotropic layer, laminated in this order,
wherein
the first optically anisotropic layer satisfies the following requirements [1] to [3]:

$$50 \leq Re1 \leq 500 \quad [1]$$

$$30 \leq Rth1 \leq 750 \quad [2]$$

$$0.6 \leq Rth1/Re1 \leq 1.5 \quad [3]$$

wherein Re1 and Rth1 denote the retardation values in the plane and thickness direction of the first optically anisotropic layer, respectively and are defined as $Re1=(nx1-ny1) \times d1$ [nm] and $Rth1=\{(nx1+ny1)/2-nz1\} \times d1$ [nm], respectively wherein d1 indicates the thickness of the first optically anisotropic layer, nx1 and ny1 indicate the main refractive indices in the plane of the first optically anisotropic layer with respect to a light of a wavelength of 550 nm, nz1 indicates the main refractive index in the thickness direction of the first optically anisotropic layer with respect to a light of a wavelength of 550 nm, and $nx1>ny1 \geq nz1$;
the second optically anisotropic layer satisfies the following requirements [4] and [5]:

$$0 \leq Re2 \leq 20 \quad [4]$$

$$-500 \leq Rth2 \leq -30 \quad [5]$$

wherein Re2 and Rth2 denote the retardation values in the plane and thickness direction of the second optically anisotropic layer, respectively and are defined as $Re2=(nx2-ny2) \times d2$ [nm] and $Rth2=\{(nx2+ny2)/2-nz2\} \times d2$ [nm], respectively wherein d2 indicates the thickness of the second optically anisotropic layer, nx2 and ny2 indicate the main refractive indices in the plane of the second optically anisotropic layer with respect to a light of a wavelength of 550 nm, nz2 indicates the main refractive index in the thickness direction of the second optically anisotropic layer with respect to a light of a wavelength of 550 nm, and $nz2>nx2 \geq ny2$; and
the third optically anisotropic layer satisfies the following requirements [6] to [8]:

$$100 \leq Re3 \leq 180 \quad [6]$$

$$50 \leq Rth3 \leq 600 \quad [7]$$

$$0.5 \leq Rth3/Re3 \leq 3.5 \quad [8]$$

wherein Re3 and Rth3 denote the retardation values in the plane and thickness direction of the third optically anisotropic layer, respectively and are defined as $Re3=(nx3-ny3) \times d3$ [nm] and $Rth3=\{(nx3+ny3)/2-nz3\} \times d3$ [nm], respectively wherein d3 indicates the thickness of the third optically anisotropic layer, nx3 and ny3 indicate the main refractive indices in the plane of the third optically anisotropic layer with respect to a light of a wavelength of 550 nm, nz3 indicates the main refractive index in the thickness direction of the third optically anisotropic layer with respect to a light of a wavelength of 550 nm, and $nx3>ny3 \geq nz3$;

[2] the elliptical polarizer according to [1] above, wherein the second optically anisotropic layer comprises a homeotropically aligned liquid crystal film produced by aligning and fixing a liquid crystalline composition exhibiting a positive uniaxiality, in a homeotropic alignment while the composition is in the liquid crystal state;

[3] the elliptical polarizer according to [2] above, wherein the liquid crystalline composition exhibiting a positive uniaxiality comprises a side chain liquid crystalline polymer having an oxetanyl group;

[4] the elliptical polarizer according to [1] above, wherein the first and third optically anisotropic layers each comprise a polycarbonate or a cyclic polyolefin;

[5] the elliptical polarizer according to any one of [1] to [4] above, wherein the third optically anisotropic layer further satisfies the following requirement [12]:

$$0.7 \leq Re3(450)/Re3(590) \leq 1.05 \quad [12]$$

wherein Re3(450) and Re3(590) indicate the retardation values in the plane of the third optically anisotropic layer with respect to lights of wavelengths of 450 nm and 590 nm, respectively;

[6] the elliptical polarizer according to any one of [1] to [5] above, wherein when the angle formed by the absorption axis of the first polarizer and the slow axis of the first optically anisotropic layer is defined as "r", the first polarizer and first optically anisotropic layer are laminated so as to satisfy $80° \leq r \leq 100°$;

[7] the elliptical polarizer according to any one of [1] to [6] above, wherein when the angle formed by the absorption axis of the first polarizer and the slow axis of the third optically anisotropic layer is defined as "p", p satisfies $40° \leq p \leq 50°$;

[8] the elliptical polarizer according to any one of [1] to [7] above, wherein the first optically anisotropic layer also acts as a protection layer for the first polarizer;

[9] a vertical alignment type liquid crystal display device comprising at least a first polarizer, a first optically anisotropic layer, a second optically anisotropic layer, a third optically anisotropic layer, a vertical alignment type liquid crystal cell comprising a pair of substrates each provided with electrodes and liquid crystal molecules disposed therebetween, the liquid crystal molecules being aligned vertically to the substrates when no electric voltage is applied, a fourth optically anisotropic layer, and a second polarizer, arranged in this order, wherein
the first optically anisotropic layer satisfies the following requirements [1] to [3]:

$$50 \leq Re1 \leq 500 \quad [1]$$

$$30 \leq Rth1 \leq 750 \quad [2]$$

$$0.6 \leq Rth1/Re1 \leq 1.5 \quad [3]$$

wherein Re1 and Rth1 denote the retardation values in the plane and thickness direction of the first optically anisotropic layer, respectively and are defined as $Re1=(nx1-ny1) \times d1$ [nm] and $Rth1=\{(nx1+ny1)/2-nz1\} \times d1$ [nm], respectively wherein d1 indicates the thickness of the first optically anisotropic layer, nx1 and ny1 indicate the main refractive indices in the plane of the first optically anisotropic layer with respect to a light of a wavelength of 550 nm, nz1 indicates the main refractive index in the thickness direction of the first optically anisotropic layer with respect to a light of a wavelength of 550 nm, and $nx1>ny1 \geq nz1$;

the second optically anisotropic layer satisfies the following requirements [4] and [5]:

$$0 \leq Re2 \leq 20 \quad [4]$$

$$-500 \leq Rth2 \leq -30 \quad [5]$$

wherein Re2 and Rth2 denote the retardation values in the plane and thickness direction of the second optically anisotropic layer, respectively and are defined as $Re2=(nx2-ny2) \times d2$ [nm] and $Rth2=\{(nx2+ny2)/2-nz2\} \times d2$ [nm], respectively wherein d2 indicates the thickness of the second optically anisotropic layer, nx2 and ny2 indicate the main refractive indices in the plane of the second optically anisotropic layer with respect to alight of a wavelength of 550 nm, nz2 indicates the main refractive index in the thickness direction of the second optically anisotropic layer with respect to a light of a wavelength of 550 nm, and $nz2 > nx2 \geq ny2$;

the third optically anisotropic layer satisfies the following requirements [6] to [8]:

$$100 \leq Re3 \leq 180 \quad [6]$$

$$50 \leq Rth3 \leq 600 \quad [7]$$

$$0.5 \leq Rth3/Re3 \leq 3.5 \quad [8]$$

wherein Re3 and Rth3 denote the retardation values in the plane and thickness direction of the third optically anisotropic layer, respectively and are defined as $Re3=(nx3-ny3) \times d3$ [nm] and $Rth3=\{(nx3+ny3)/2-nz3\} \times d3$ [nm], respectively wherein d3 indicates the thickness of the third optically anisotropic layer, nx3 and ny3 indicate the main refractive indices in the plane of the third optically anisotropic layer with respect to a light of a wavelength of 550 nm, nz3 indicates the main refractive index in the thickness direction of the third optically anisotropic layer with respect to a light of a wavelength of 550 nm, and $nx3 > ny3 \geq nz3$; and the fourth optically anisotropic layer satisfies the following requirements [9] to [11]:

$$100 \leq Re4 \leq 180 \quad [9]$$

$$50 \leq Rth4 \leq 600 \quad [10]$$

$$0.5 \leq Rth4/Re4 \leq 3.5 \quad [11]$$

wherein Re4 and Rth4 denote the retardation values in the plane and thickness direction of the fourth optically anisotropic layer, respectively and are defined as $Re4=(nx4-ny4) \times d4$ [nm] and $Rth4=\{(nx4+ny4)/2-nz4\} \times d4$ [nm], respectively wherein d4 indicates the thickness of the fourth optically anisotropic layer, nx4 and ny4 indicate the main refractive indices in the plane of the fourth optically anisotropic layer with respect to a light of a wavelength of 550 nm, nz4 indicates the main refractive index in the thickness direction of the fourth optically anisotropic layer with respect to a light of a wavelength of 550 nm, and $nx4 > ny4 \geq nz4$.

[10] the vertical alignment type liquid crystal display device according to [9] above, further comprising a fifth optically anisotropic layer satisfying the following requirements [13] and [14] arranged between the vertical alignment type liquid crystal cell and the fourth optically anisotropic layer, $$0 \leq Re5 \leq 20 \quad [13]$$

$$100 \leq Rth5 \leq 400 \quad [14]$$

wherein Re5 and Rth5 denote the retardation values in the plane and thickness direction of the fifth optically anisotropic layer, respectively and are defined as $Re5=(nx5-ny5) \times d5$ [nm] and $Rth5=\{(nx5+ny5)/2-nz5\} \times d5$ [nm], respectively wherein d5 indicates the thickness of the fifth optically anisotropic layer, nx5 and ny5 indicate the main refractive indices in the plane of the fifth optically anisotropic layer with respect to a light of a wavelength of 550 nm, nz5 indicates the main refractive index in the thickness direction of the fifth optically anisotropic layer with respect to a light of a wavelength of 550 nm, and $nx5 \geq ny5 > nz5$;

[11] the vertical alignment type liquid crystal display device according to [9] or [10] above, wherein the second optically anisotropic layer comprises a homeotropically aligned liquid crystal film produced by aligning and fixing a liquid crystalline composition exhibiting a positive uniaxiality, in a homeotropic alignment while the composition is in the liquid crystal state;

[12] the vertical alignment type liquid crystal display device according to [11] above, wherein the liquid crystalline composition exhibiting a positive uniaxiality comprises a side chain liquid crystalline polymer having an oxetanyl group;

[13] the vertical alignment type liquid crystal display device according to any one of [9] to [12] above, wherein the first, third and fourth optically anisotropic layers each comprise a polycarbonate or a cyclic polyolefin;

[14] the vertical alignment type liquid crystal display device according to any one of [9] to [13] above, wherein the third optically anisotropic layer further satisfies the following requirement [12]:

$$0.7 \leq Re3(450)/Re3(590) \leq 1.05 \quad [12]$$

wherein Re3(450) and Re3(590) indicate the retardation values in the plane of the third optically anisotropic layer with respect to lights of wavelengths of 450 nm and 590 nm, respectively;

[15] the vertical alignment type liquid crystal display device according to any one of [9] to [14] above, wherein the fourth optically anisotropic layer further satisfies the following requirement [15]:

$$0.7 \leq Re4(450)/Re4(590) \leq 1.05 \quad [15]$$

wherein Re4(450) and Re4(590) indicate the retardation values in the plane of the fourth optically anisotropic layer with respect to lights of wavelengths of 450 nm and 590 nm, respectively;

[16] the vertical alignment type liquid crystal display device according to any one of [9] to [15] above, wherein the fifth optically anisotropic layer is a layer formed from at least one type of material selected from the group consisting of liquid crystalline compounds, triacetyl cellulose, cyclic polyolefins, polyolefins, polyamides, polyimides, polyesters, polyether ketones, polyarylether ketones, polyamide imides, and polyester imides;

[17] the vertical alignment type liquid crystal display device according to any one of [9] to [16] above, wherein when the angle formed by the absorption axis of the first polarizer and the slow axis of the first optically anisotropic layer is defined as "r", the first polarizer and third optically anisotropic layer are laminated so as to satisfy $80° \leq r \leq 100°$;

[18] the vertical alignment type liquid crystal display device according to any one of [9] to [17] above, wherein the third optically anisotropic layer and the fourth optically anisotropic layer are laminated so that their slow axes form an angle of 80° to 100°.

[19] the vertical alignment type liquid crystal display device according to any one of [9] to [18] above, wherein when the angle formed by the absorption axis of the first polarizer and the slow axis of the third optically anisotropic layer is defined as "p" and the angle formed by the absorption axis of the second polarizer and the slow axis of the fourth optically anisotropic layer is defined as "q", p satisfies $40° \leq p \leq 50°$ and q satisfies $40° \leq q \leq 50°$;

[20] the vertical alignment type liquid crystal display device according to any one of [9] to [19] above, wherein the first optically anisotropic layer also acts as a protection layer for the first polarizer;

[21] the vertical alignment type liquid crystal display device according to any one of [9] to [20] above, wherein one of the pair of substrates of the vertical alignment type liquid crystal cell is a substrate having a region with a reflection function and a region with a transmission function.

Advantageous Effects of Invention

The vertical alignment type liquid crystal display device of the present invention is bright in images and capable of displaying images of high contrast in all the directions.

BRIEF DESCRIPTION OF DRAWINGS

[FIG. 1] a schematic sectional view of an elliptical polarizer according to the present invention;

[FIG. 2] a schematic sectional view of the vertical alignment type liquid crystal display device used in Example 2;

[FIG. 3] a plan view indicating the angular relations of each of the components of the vertical alignment type liquid crystal display of Example 2;

[FIG. 4] a view indicating the contrast ratio when viewing the vertical alignment type liquid crystal display of Example 2 from all the directions;

[FIG. 5] a schematic sectional view of the vertical alignment type liquid crystal display device used in Example 3;

[FIG. 6] a plan view indicating the angular relations of each of the components of the vertical alignment type liquid crystal display of Example 3;

[FIG. 7] a view indicating the contrast ratio when viewing the vertical alignment type liquid crystal display of Example 3 from all the directions;

[FIG. 8] a schematic sectional view of the transflective vertical alignment type liquid crystal display device used in Example 4;

[FIG. 9] a plan view indicating the angular relations of each of the components of the transflective vertical alignment type liquid crystal display device used in Example 4;

[FIG. 10] a view indicating the contrast ratio when viewing the transflective vertical alignment type liquid crystal display device used in Example 4;

[FIG. 11] a schematic sectional view of the vertical alignment type liquid crystal display device used in Comparative Example 1;

[FIG. 12] a plan view indicating the angular relations of each of the components of the vertical alignment type liquid crystal display device used in Comparative Example 1; and

[FIG. 13] a view indicating the contrast ratio when viewing the vertical alignment type liquid crystal display device used in Comparative Example 1.

BEST MODE FOR CARRYING OUT THE INVENTION

The present invention will be described below in more details.

As shown in FIG. 1, the elliptical polarizer of the present invention comprises at least a first polarizer, a first optically anisotropic layer, a second optically anisotropic layer, and a third optically anisotropic layer, laminated in this order.

The vertical alignment type liquid crystal display device of the present invention has a structure of the following (1) or (2) and if necessary may further contain members such as a light diffusion layer, a light controlling film, a light guiding plate and a prism sheet. No particular limitation is imposed on structure of the display device except for using the second optically anisotropic layer comprising a homeotropically-aligned liquid crystal film. With the objective of obtaining optical characteristics with less viewing angle dependency, either (1) or (2) may be used.

(1) first polarizer/first optically anisotropic layer/second optically anisotropic layer/third optically anisotropic layer/vertical alignment type liquid crystal cell/fourth optically anisotropic layer/second polarizer/backlight;

(2) first polarizer/first optically anisotropic layer/second optically anisotropic layer/third optically anisotropic layer/vertical alignment type liquid crystal cell/fifth optically anisotropic layer/fourth optically anisotropic layer/second polarizer/backlight With the above-described structures, 8 sheets of films proposed in Patent Documents 3 and 4 can be decreased to 4 or 5 sheets thereby maintaining wide viewing angle characteristics while decreasing the production cost.

In the present invention, although the absorption axis of the first polarizer is perpendicular to the slow axis of the first optically anisotropic layer, the use of a negative biaxially optically anisotropic layer as the first optically anisotropic layer enables production of the elliptical polarizer by roll-to-roll method but not by lamination of sheets that has been conventionally carried out. As the result, an elliptical polarizer with a thin structure can be produced efficiently.

Constituting parts used in the present invention will be described below in turn.

First of all, a vertical alignment type liquid crystal cell used in the present invention will be described.

No particular limitation is imposed on the liquid crystal cell, which may, therefore, be of transmissive, reflective or transflective type. No particular limitation is imposed on the driving mode of the liquid crystal cell, which may, therefore, be a passive matrix mode used in an STN-LCD, an active matrix mode using active electrodes such as TFT (Thin Film Transistor) electrodes and TFD (Thin Film Diode) electrodes, and a plasma address mode.

No particular limitation is imposed on transparent substrates constituting the liquid crystal cell as long as they can align a liquid crystalline material forming a liquid crystal layer in a specific alignment direction. More specific examples include those which themselves have a property of aligning a liquid crystalline material and those which themselves have no capability of aligning but are provided with an alignment layer capable of aligning a liquid crystalline material. The electrode of the liquid crystal cell may be any conventional electrode, such as ITO. The electrode may be usually arranged on the surface of the transparent substrate, which surface contacts the liquid crystal layer. In the case of using a transparent substrate with an alignment layer, an electrode may be provided between the alignment layer and the substrate.

No particular limitation is imposed on the material exhibiting liquid crystallinity, forming the liquid crystal layer as long as it has a negative dielectric anisotropy. Examples of the material include various low molecular weight liquid crystalline substances, polymeric liquid crystalline substances, and mixtures thereof, which can constitute various liquid crystal cells. The liquid crystal material may be blended with dyes, chiral dopants, or non-liquid crystalline substances to an extent that they do not prevent the liquid crystalline substance from exhibiting liquid crystallinity. If a chiral dopant is added to a vertical alignment type liquid crystal layer containing a liquid crystal material with a negative dielectric anisotropy, rotation of the liquid crystalline molecules upon application of an electric voltage can be stabilized. Further, when the alignment layers in the vicinity of the two substrates are rubbed in different directions, the traces of the alignment treatment are not in the same directions and thus are less visible. When the liquid crystal layer is twisted at an angle of 90 degrees, black display with very little optical leakage is obtained because the tilt directions of the liquid crystal molecules in the vicinity of the two substrates make an angle of 90 degrees, and thus the retardations generated in the tilt directions are counteracted by each other.

Alternatively, replacement of one of the substrates of the vertical alignment type liquid crystal cell with a substrate having a region with a reflection function and a region with a transmission function can convert the cell to a transflective vertical alignment type liquid crystal cell.

No particular limitation is imposed on the region with a reflection function (which may be hereinafter referred to as "reflection layer") contained in the transflective electrode used in the transflective vertical alignment type liquid crystal cell. Examples of the region include those formed of aluminum, silver, gold, chromium, and platinum, an alloy containing one or more of these metals, an oxide such as magnesium oxide, a multi-layered film of dielectrics, a liquid crystal film exhibiting a selective reflectivity, and combinations thereof. The reflection layer may be flat or curved and may be those provided with diffusive reflectivity by forming rugged patterns on its surface; those having a function as the electrode on the transparent substrate located on the side opposite to the viewer's side; or any combination thereof.

In addition to the above-described components, the vertical alignment type liquid crystal cell used in the present invention may be provided with other additional components. For example, the use of a color filter makes it possible to produce a color liquid crystal display device which can provide multi- or full-colored display images with increased color purity.

Next, description will be given of optically anisotropic layers used in the present invention.

First of all, the first, third and fourth optically anisotropic layers will be described.

Examples of these optically anisotropic layers include birefringence films formed of appropriate polymers including polycarbonates, cyclic polyolefins such as norbornene resins, polyvinyl alcohols, polystyrenes, polymethyl methacrylates, polypropylenes, other polyolefins, polyarylates, and polyamides by a uniaxial or biaxial stretching treatment or a technique as disclosed in Japanese Patent Application Laid-Open Publication No. 5-157911 wherein an elongate film is heat-contracted in the width direction using a heat-contractive film to increase the retardation in the thickness direction; aligned films formed of liquid crystal materials such as liquid crystal polymers; and aligned layers of liquid crystal materials supported on a film.

When the x and y directions are taken in the plane direction and the thickness direction is defined as z direction, a positive uniaxial optically anisotropic layer has a relation of refraction index defined as $nx>ny=nz$. A positive biaxial optically anisotropic layer has a relation of refraction index defined as $nx>nz>ny$. A negative uniaxial optically anisotropic layer has a relation of refraction index defined as $nx=ny>nz$. A negative biaxial optically anisotropic layer has a relation of refraction index defined as $nx>ny>nz$.

When the thickness of the first optically anisotropic layer is defined as d1, the main refractive indices in the plane are defined as nx1 and ny1, the main refractive index in the thickness direction is defined as nz1, $nx1>ny1>nz1$, the retardation values in the plane and thickness direction with respect to a light of a wavelength of 550 nm are defined as $Re1=(nx1-ny1)\times d1$ [nm], and $Rth1=\{(nx1+ny1)/2-nz1\}\times d1$ [nm], respectively the first optically anisotropic layer satisfies the following formulas [1] to [3]:

$$50 \leq Re1 \leq 500 \quad [1]$$

$$30 \leq Rth1 \leq 750 \quad [2]$$

$$0.6 \leq Rth1/Re1 \leq 1.5. \quad [3]$$

The first optically anisotropic layer contributes to compensate the viewing angle of a polarizer, and the retardation value (Re1) in the plane of the first optically anisotropic layer with respect to a light of a wavelength of 550 nm is usually from 50 to 500 nm, preferably from 80 to 480 nm, more preferably from 100 to 450 nm. If the Re1 value deviates these ranges, sufficient viewing angle may not be obtained or unnecessary coloration may occur when viewed obliquely.

The retardation value (Rth1) in the thickness direction of the first optically anisotropic layer with respect to a light of a wavelength of 550 nm is from 30 to 750 nm, preferably from 40 to 500 nm, more preferably from 50 to 200 nm. If the Rth1 value deviates these ranges, sufficient viewing angle may not be obtained or unnecessary coloration may occur when viewed obliquely.

The ratio of the thickness retardation value (Rth1) to the plane retardation value (Re1) of the first optically anisotropic layer is usually from 0.6 to 1.5, preferably from 0.6 to 1.4, more preferably from 0.6 to 1.3. If the Rth/Re value deviates the above ranges, sufficient viewing angle may not be obtained or unnecessary coloration may occur when viewed obliquely.

When the angle formed by the absorption axis of the first polarizer and the slow axis of the first optically anisotropic layer is defined as r, r is usually from 80 to 100°, preferably from 85 to 95, more preferably about 90° (orthogonal). The first polarizer and the first optically anisotropic layer both in the form of elongate rolls are combined by laminating them in a roll to roll process so that the absorption axis of the first polarizer is substantially perpendicular to the slow axis of the first optically anisotropic layer (referring to the crossing angle within 90°±10°, preferably ±5°). As the result, a thin elliptical polarizer can be produced highly efficiently. However, in order to combine integrally the first polarizer and first optically anisotropic layer so that the absorption axis is perpendicular to the absorption axis, the slow axis of the first optically anisotropic layer needs to be aligned perpendicularly to the roll elongate direction. In order to achieve this, it is preferable to produce the first optically anisotropic layer through transverse uniaxial stretching or transverse biaxial stretching. In general, when the layer is produced through transverse uniaxial stretching or transverse biaxial stretching, it is known that the relation of birefringence of the retardation film will be a negative biaxial represented by $nx>ny>nz$. Therefore, for the highly efficient production of an elliptical polarizer, the Rth/Re value is preferably within the above-described range of 0.6 to 1.5. An Rth/Re value deviating this range would result in a deterioration in image quality caused by a decrease in the front contrast.

Preferably, the third and fourth optically anisotropic layers exhibit a ¼ wavelength retardation in the plane. When the thicknesses of the third and fourth optically anisotropic layers are defined as d3, d4, respectively, the main refractive indices in the planes are defined as nx3, nx4 and ny3, ny4, respectively, the main refractive indices in the thicknesses are defined as nz3 and nz4, respectively, nx3>ny3≧nz3, nx4>ny4≧nz4, the retardation values in the planes with respect to a light of a wavelength of 550 nm are defined as (Re3=(nx3−ny3)×d3 [nm]) and (Re4=(nx4−ny4)×d4 [nm]), respectively, the third and fourth optically anisotropic layers satisfy the following formulas [6] to [8] and [9] to [11], respectively:

$$100 \leq Re3 \leq 180 \qquad [6]$$

$$50 \leq Rth3 \leq 600 \qquad [7]$$

$$0.5 \leq Rth3/Re3 \leq 3.5 \qquad [8]$$

$$100 \leq Re4 \leq 180 \qquad [9]$$

$$50 \leq Rth4 \leq 600 \qquad [10]$$

$$0.5 \leq Rth4/Re4 \leq 3.5. \qquad [11]$$

Since the third and fourth optically anisotropic layers exhibit a ¼ wavelength retardation, their retardation values (Re3, Re4) in the planes with respect to a light of a wavelength of 550 nm are from 100 to 180 nm, preferably from 120 to 160 nm, more preferably 130 to 150 nm. If the Re3 and Re4 values deviate these ranges, sufficient circular polarization may not be attained when used in combination with a polarizer and display characteristics when viewed from the front may be deteriorated.

The retardation values (Rth3, Rth4) of the third and fourth optically anisotropic layers in the thickness directions are necessarily set to such conditions that they function as ¼ wavelength plates when viewed from the front and at the same time exhibit a viewing angle compensation effect caused by compensating the retardation in the thickness direction of the vertical alignment type liquid crystal cell. Therefore, the retardation values of the third and fourth optically anisotropic layers are from 50 to 600 nm, preferably from 100 to 400 nm, more preferably from 140 to 300 nm though depending on the retardation value in the thickness direction of the vertical alignment type liquid crystal cell. If the retardation values of the third and fourth optically anisotropic layers deviate these ranges, sufficient viewing angle improving effect may not be attained or unnecessary coloration may occur when viewed obliquely.

The ratio of the retardation values (Rth3, Rth4) in the thickness direction of the third and fourth optically anisotropic layers to those (Re3, Re4) in the plane thereof is usually from 0.5 to 3.5, preferably from 1.0 to 3.0, more preferably from 1.5 to 2.5. If the Rth/Re values deviate from these ranges, sufficient viewing angle improving effect may not be attained or unnecessary coloration may occur when viewed obliquely.

The angle defined by the slow axis of the third optically anisotropic layer and the slow axis of the fifth optically anisotropic layer is usually from 80 to 100 degrees, preferably from 85 to 95 degrees, more preferably about 90 degrees (perpendicular). If the angle deviates these ranges, the contrast when viewed from the front would be decreased.

When the retardation values in the plane of the third and fourth optically anisotropic layers with respect to a light of a wavelength of 450 nm and a light of a wavelength of 590 nm are defined as Re3(450), Re3(590) and Re4(450), Re4(590), respectively, they satisfy the following formulas [12] and [15]:

$$0.7 \leq Re3(450)/Re3(590) \leq 1.05 \qquad [12]$$

$$0.7 \leq Re4(450)/Re4(590) \leq 1.05. \qquad [15]$$

In order to enhance the contrast characteristics of a transflective vertical alignment type liquid crystal display device upon reflection mode, the dependency on wavelength of the retardation of the ¼ wavelength plate is preferably larger as the wavelength becomes larger or closely constant and the ratio of the retardation values of the third and fourth optically anisotropic layers with respect to a light of wavelength of 450 nm and a light of wavelength of 590 nm is usually from 0.7 to 1.05, preferably from 0.75 to 1.0. If the ratio deviates these ranges, the displaying characteristics may be deteriorated, for example, black image becomes bluish when the liquid crystal display device is in the reflection mode.

A circular polarizer has a function to change a linearly polarized light to a circularly polarized light and change a circularly polarized light to a linearly polarized light with a ¼ wavelength plate. Therefore, provision of the third and fourth optically anisotropic layers having a ¼ wavelength retardation in the planes, between the linear polarizer and the vertical alignment type liquid crystal cell enables the transflective vertical alignment type liquid crystal display device to display black images because the retardation in the observing direction is zero when no electric voltage is applied and to display bright images because the retardation in the observing direction occurs when an electric voltage is applied, by arranging the upper and lower polarizers perpendicularly to one another. With the objective of forming a circular polarizer which is the combination of a linear polarizer and a ¼ wavelength plate, the angle p defined by the absorption axis of the first polarizer and the slow axis of the third optically anisotropic layer is usually from 40 to 50 degrees, preferably from 42 to 48 degrees, more preferably about 45 degrees.

Similarly, the angle q defined by the absorption axis of the second polarizer and the slow axis of the fourth optically anisotropic layer is usually from 40 to 50 degrees, preferably from 42 to 48 degrees, more preferably about 45 degrees. The angle deviating these ranges would result in a deterioration in image quality caused by a decrease in the front contrast.

Next, the second optically anisotropic layer will be described.

The second optically anisotropic layer used in the present invention comprises a homeotropically-aligned liquid crystal film produced by aligning homeotropically a liquid crystal material exhibiting a positive uniaxiality while the material is in a liquid crystal state and then fixing the alignment.

In the present invention, selection of a liquid crystal material and an alignment substrate is extremely important for producing a liquid crystal film wherein a liquid crystal material is fixed in a homeotropic alignment.

Liquid crystal materials used in the present invention are those containing at least mainly a side chain liquid crystalline polymer such as poly(meth)acrylates and polysiloxanes.

Side chain liquid crystalline polymers used in the present invention are those having at one of its terminal ends a polymerizable oxetanyl group. More specifically, preferred examples include side chain liquid crystalline polymeric compounds produced by homopolymerizing or copolymerizing the (meth)acrylic portion of a (meth)acrylic compound having an oxetanyl group represented by formula (1) below with another (meth)acrylic compound:

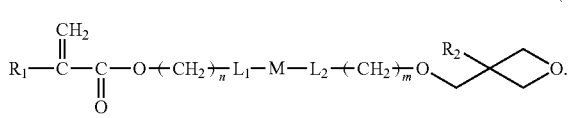
(1)

In formula (1), $R_1$ is hydrogen or methyl, $R_2$ is hydrogen, methyl, or ethyl, $L_1$ and $L_2$ are each a single bond, —O—, —O—CO— or —CO—O—, M is represented by any of formulas (2) to (4) below, and m and n are each an integer of 0 to 10:

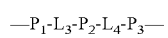 (2)

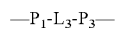 (3)

 (4).

In formulas (2) to (4), $P_1$ and $P_2$ are each a group represented by formula (5) below, $P_3$ is a group represented by formula (6) below, and $L_3$ and $L_4$ are each a single bond, —CH=CH—, —C≡C—, —O—, —O—CO—, or —CO—O—:

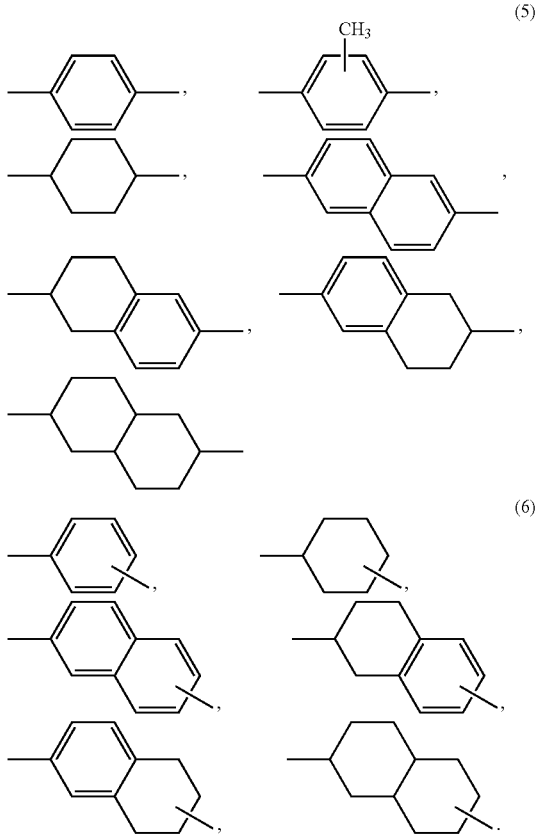

No particular limitation is imposed on the method of synthesizing the (meth)acrylic compound having an oxetanyl group. Therefore, there may be used any conventional method utilized in the field of organic chemistry. For example, a portion having an oxetanyl group is coupled to a portion having a (meth)acrylic group by means of the Williamson's ether synthesis or an ester synthesis using a condensing agent thereby synthesizing a (meth)acrylic compound having two reactive functional groups, i.e., an oxetanyl group and a (meth)acrylic group.

A side chain polymeric liquid crystalline compound containing a unit represented by formula (7) below is produced by homopolymerizing the (meth)acrylic group of a (meth) acrylic compound having an oxetanyl group represented by formula (1) or copolymerizing the same with another (meth) acrylic compound:

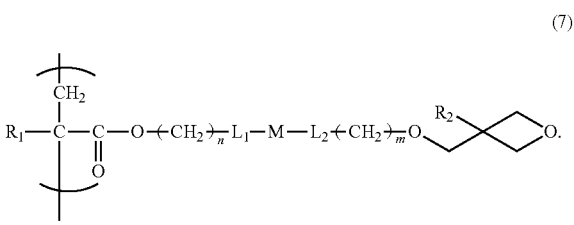
(7)

As an example of the radical polymerization, a method may be used in which a (meth)acrylic compound is dissolved in a solvent such as dimethylformamide (DMF) and reacted at a temperature of 60 to 120° C. for several hours using 2,2'-azobisisobutylonitrile (AIBN) or benzoyl peroxide (BPO) as an initiator. Alternatively, in order to allow the liquid crystal phase to be stably exhibited there is an effective method in which living radical polymerization is conducted using an initiator such as a copper (I) bromide/2,2'-bipyridyl-based initiator or a 2,2,6,6-tetramethylpiperidinyloxy free radical (TEMPO)-based initiator so as to control the molecular weight distribution. These radical polymerizations are preferably carried out under deoxidation conditions.

As an example of the anionic polymerization, a method may be used in which a (meth)acrylic compound is dissolved in a solvent such as tetrahydrofuran (THF) and reacted using a strong base such as organic lithium compounds, organic sodium compounds or the Grignard reagent as an initiator. Alternatively, this polymerization can be converted to living anionic polymerization by optimizing the initiator or reaction temperature thereby controlling the molecular weight distribution. These anionic polymerizations are needed to be conducted strictly under dehydration and deoxidation conditions.

No particular limitation is imposed on types of a (meth) acrylic compound added to be copolymerized as long as the resulting polymeric substance exhibits liquid crystallinity. However, preferred are (meth)acrylic compounds having a mesogen group because they can enhance the liquid crystallinity of the resulting polymeric substance. More specifically, particularly preferred are those as represented by the following formulas:

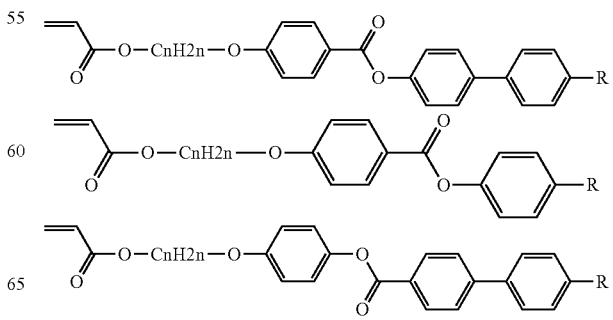

-continued

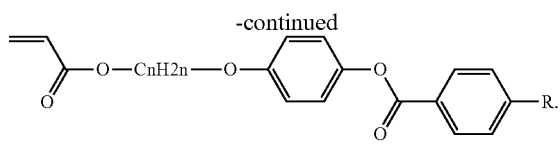

In the above formulas, R is hydrogen, an alkyl group having 1 to 12 carbon atoms, an alkoxy group having 1 to 12 carbon atoms, or a cyano group.

The side chain liquid crystalline polymeric compound contains a unit of formula (7) in an amount of preferably 5 to 100 percent by mole, particularly preferably 10 to 100 percent by mole. The side chain liquid crystalline polymeric compound has a weight average molecular weight of preferably 2,000 to 100,000, particularly preferably 5,000 to 50,000.

Other than the above-described side chain liquid crystalline polymeric compounds, the liquid crystal material used in the present invention may contain various compounds which may be mixed therewith out impairing the liquid crystallinity. Examples of such compounds include those having a cationic polymerizable functional group such as oxetanyl, epoxy, and vinylether groups; various polymeric compounds having a film forming capability; and various low molecular- or polymeric-liquid crystalline compounds exhibiting liquid crystallinity. When the side chain liquid crystalline polymeric compound is used in the form of a composition, the percentage of the compound in the whole composition is preferably 10 percent by mass or more, preferably 30 percent by mass or more, more preferably 50 percent by mass or more. When the side chain liquid crystalline polymeric compound is contained in an amount of less than 10 percent by mass, the concentration of the polymerizable group in the composition will be low, resulting in insufficient mechanical strength after polymerization.

The above-described liquid crystal material is aligned and fixed in a liquid crystal state by polymerizing cationically the oxetanyl group to be cross-linked. Therefore, the liquid crystal material preferably contains a photo- or thermal-cation generator which generates cations with an external stimulus such as light or heat. If necessary, various sensitizers may be used in combination.

The term "photo cation generator" used herein denotes a compound which can generate cations by irradiating a light with a specific wavelength and may be any of organic sulfonium salt-, iodonium salt-, or phosphonium salt-based compounds. Counter ions of these compounds are preferably antimonate, phosphate, and borate. Specific examples include $Ar_3S^+SbF_6^-$, $Ar_3P^+BF_4^-$, and $Ar_2I^+PF_6^-$ wherein Ar indicates a phenyl or substituted phenyl group. Sulfonic acid esters, triazines, diazomethanes, β-ketosulfones, iminosulfonates, and benzoinsulfonates may also be used.

The term "thermal cation generator" used herein denotes a compound which can generate cations by being heated to a certain temperature and may be any of benzylsulfonium salts, benzylammonium salts, benzylpyridinium salts, benzylphosphonium salts, hydrazinium salts, carbonic acid esters, sulfonic acid esters, amineimides, antimony pentachloride-acetyl chloride complexes, diaryliodonium salt-dibenzyloxy coppers, and halogenated boron-tertiary amine adducts.

Since the amount of the cation generator to be added in the polymerizable liquid crystalline composition varies depending on the structures of the mesogen portion or spacer portions constituting the side chain liquid crystalline polymer to be used, the equivalent weight of the oxetanyl group, and the conditions for aligning the composition in the liquid crystal state, it can not be determined with certainty. However, it is within the range of usually 100 ppm by mass to 20 percent by mass, preferably 1,000 ppm by mass to 10 percent by mass, more preferably 0.2 percent by mass to 7 percent by mass, and most preferably 0.5 percent by mass to 5 percent by mass. An amount of the cation generator of less than 100 ppm by mass is not preferable because polymerization may not progress due to the insufficient amount of cation to be generated. An amount of the cation generator of more than 20 percent by mass is not also preferable because a large amount of the undecomposed residue of the cation generator remains in the resulting liquid crystal film and thus the light resistance thereof would be degraded.

The alignment substrate will be described next.

The alignment substrate which may be used in the present invention is preferably a substrate with a flat and smooth surface. Examples of such a substrate include films or sheets formed of organic polymeric materials, glass sheets, and metals. It is preferable to use materials such as organic polymer materials, in view of cost and continuous productivity. Examples of the organic polymeric materials include films formed of transparent polymers such as polyvinyl alcohols, polyimides, polyphenylene oxides, polyetherketones, polyetheretherketones, polyester-based polymers such as polyethylene terephthalates and polyethylene naphthalates, cellulose-based polymers such as diacetyl cellulose and triacetyl cellulose; polycarbonate-based polymers; and acryl-based polymers such as polymethyl methacrylates. Further examples include films formed of transparent polymers, for example, styrene-based polymers such as polystyrenes and acrylonitrile styrenecopolymers; olefin-based polymers such as polyethylenes, polypropylenes and ethylene propylene copolymers; cyclopolyolefins having a cyclic or norbornene structure; vinyl chloride-based polymers; and amide-based polymers such as nylon and aromatic polyamides. Further examples include films formed of transparent polymers, for example, imide-based polymers; sulfone-based polymers; polyether sulfone-based polymers; polyetheretherketone-based polymers; polyphenylene sulfide-based polymers; vinyl alcohol-based polymers; vinylidene chloride-based polymers; vinyl butyral-based polymers; arylate-based polymers; polyoxymethylene-based polymers; epoxy-based polymers; and blends of these polymers. Among these polymers, it is preferable to use plastic films such as triacetyl cellulose, polycarbonates, and norbornene polyolefins that are used as optical films. Particularly preferable examples of the films of organic polymer materials include plastic films formed of polymer substances having a norbornene structure such as ZEONOR (product name, manufactured by ZEON CORPORATION), ZEONEX (product name, manufactured by ZEON CORPORATION) and ARTON (product name, manufactured by JSR Corporation) because their excellent optical characteristics. Examples of metal films include those formed of aluminum.

In order to obtain the homeotropic alignment stably using the above-described liquid crystal materials, the material forming an alignment substrate preferably has a long chain (usually 4 or more, preferably 8 or more carbon atoms) alkyl group or a layer of a compound having a long chain alkyl group, on a surface of the substrate. It is particularly preferable to form a layer of polyvinyl alcohol having a long chain alkyl group because the layer can be easily formed. The organic polymeric materials may be used alone as an alignment substrate or in the form of film formed on another substrate. In the field of the liquid crystal, a substrate is generally rubbed with cloth for aligning a liquid crystal material, so-called rubbing treatment. However, the homeotropically-aligned liquid crystal film of the present invention has an alignment structure wherein anisotropy in the film plane does not substantially occurs and thus does not always need a rubbing treatment. However, with the objective of restraining the liquid crystal material from being repelled when it is coated on an alignment film, a weak rubbing treatment is preferably carried out. An important set value for regulating the rubbing conditions is a peripheral velocity ratio. The peripheral velocity ratio denotes a ratio of the moving velocity of the rubbing cloth to the moving velocity of the substrate when a rubbing cloth wrapped around a roll is rolled and rubs over a substrate. The weak rubbing treatment denotes a rubbing treatment carried out by rotating the rubbing cloth at a peripheral velocity ratio of usually 50 or less, preferably 25 or less, and particularly preferably 10 or less. A peripheral velocity ratio of greater than 50 would be too strong rubbing effect which fails to align the liquid crystal material in a complete vertical position, which material is tilted toward the plane direction rather than the vertical direction.

Next, a method for producing the homeotropically-aligned liquid crystal film will be described below.

Although not restricted, the liquid crystal film may be produced by spreading the above-described liquid crystal material over the above-described alignment substrate so as to be aligned and fixed in an aligned state by photo-irradiation and/or heat treatment.

Examples of the method of forming a liquid crystal material layer by spreading the liquid crystal material over the alignment substrate include a method wherein the liquid crystal material in a molten state is directly coated over the alignment substrate or a method wherein a solution of the liquid crystal material is coated over the alignment substrate and dried to evaporate the solvent.

No particular limitation is imposed on the solvent used for preparing the solution as long as it can dissolve the liquid crystal material and be evaporated under appropriate conditions. Preferable examples of the solvent include ketones such as acetone, methyl ethyl ketone, isophorone, and cyclohexanone; ether alcohols such as butoxy ethyl alcohol, hexyloxy ethyl alcohol, and methoxy-2-propanol; glycol ethers such as ethylene glycol dimethylether and diethylene glycol dimethyl ether; esters such as ethyl acetate and ethyl lactate; phenols such as phenol and chlorophenol; amides such as N,N-dimethylformamide, N,N-dimethylacetoamide, and N-methylpyrrolidone; halogens such as chloroform, tetrachloroethane and dichlorobenzene; and mixtures thereof. Surfactants, de foaming agents, or leveling agents may be added to the solution so as to form a uniform film layer on an alignment substrate.

Regardless of whether the liquid crystal material is coated directly or in the form of a solution, no particular limitation is imposed on the method of coating the liquid crystal material as long as the uniformity of the film layer can be maintained. For example, it is possible to use spin coating, die coating, curtain coating, dip coating, and roll coating methods. The coating of a solution of the liquid crystal material is preferably followed by a drying step for removal of the solvent after coating. No particular limitation is imposed on the drying step as long as it can maintain the uniformity of the coated film, which may be any conventional method. For example, a method using a heater (furnace) or a hot air blowing may be used.

The thickness of the liquid crystal film can not be determined with certainty because it depends on the mode of a liquid crystal display device or various optical parameters but is usually from 0.2 μm to 10 μm, preferably from 0.3 μm to 5 μm, more preferably from 0.5 μm to 2 μm. A film thickness of less than 0.2 μm would fail to obtain sufficient viewing angle improving effect or brightness enhancing effect. A film thickness of greater than 10 μm would cause unnecessary coloration on a liquid crystal display device.

The liquid crystal material layer formed on the alignment substrate is aligned in a liquid crystal state by a heat treatment or the like and then cured by photo-irradiation and/or a heat treatment so as to be fixed in the alignment. During the first heat treatment, the liquid crystal material is heated to a temperature in such a range that the liquid crystal material exhibits a liquid crystal phase, so as to be aligned by its peculiar self-alignability. Since the conditions for the heat treatment vary in optimum conditions and limits depending on the liquid crystal phase behavior temperature (transition temperature) of the liquid crystal material to be used, it can not be determined with certainty. However, the heat treatment is conducted at a temperature within the range of usually 10 to 250° C., preferably 30 to 160° C., more preferably at a temperature higher than the Tg of the liquid crystal material, more preferably at a temperature higher by 10° C. or higher than the Tg of the liquid crystal material. A too low temperature is not preferable because there is a possibility that the liquid crystal material may not be aligned sufficiently, while a too high temperature is not also preferable because the cationically polymerizable reactive group in the liquid crystal material or an alignment film substrate may be adversely affected. The heat treatment is conducted for usually 3 seconds to 30 minutes, preferably 10 seconds to 10 minutes. A heat treatment for shorter than 3 seconds is not preferable because there is a possibility that the liquid crystal material may not be aligned in a liquid crystal phase completely. Whereas, a heat treatment for longer than 30 minutes is not also preferable because the productivity is diminished.

After the liquid crystal material is aligned in a liquid crystal state by a heating treatment, it is cured (cross-linked) by polymerizing the oxetanyl group therein while being retained in the aligned state. This curing step is carried out for the purpose of fixing the completed liquid crystal alignment by a curing (cross-linking) reaction so that the liquid crystal material is modified into a stronger film.

Since the liquid crystal material used in the present invention has a polymerizable oxetanyl group, it is preferable to use a cationic polymerization initiator (cation generator) for polymerizing (cross-linking) the reactive group. As such a cation generator, a photo-cation generator is preferred to a thermal-cation generator.

In the case of using a photo-cation generator, after addition thereof, the processes up to the heating treatment for aligning the liquid crystal material are conducted under such dark conditions (conditions where light is shielded to an extent that the photo-cation generator does not dissociate) that the liquid crystal material does not cure until subjected to the aligning process and thus can be aligned while maintaining sufficient flowability. Thereafter, a light from a light source capable of emitting an appropriate wavelength of light is irradiated so as to allow the photo-cation generator to generate cations thereby curing the liquid crystal material.

The light irradiation is conducted by irradiating a light from a light source having a spectrum in an absorption wavelength region of the photo-cation generator to be used, such as a metal halide lamp, a high-pressure mercury lamp, a low-pressure mercury lamp, a xenon lamp, an arc discharge lamp, and a laser thereby decomposing the photo-cation generator. The irradiation dose per $cm^2$ is within the range of generally 1 to 2,000 mJ, preferably 10 to 1,000 mJ in the integrated irradiation dose. However, when the absorption region of the photo-cation generator is extremely different from the spectrum of the light source, or the liquid crystal material itself can absorb a light in the wavelength of the light source, the irradiation dose is not limited to the above range. In these cases, a method may be employed in which a suitable photo sensitizer or two or more types of photo-cation generators having different absorption wavelengths may be used.

The temperature upon light irradiation needs to be within such a range that the liquid crystal material is aligned in a liquid crystal phase. Furthermore, the light irradiation is preferably conducted at a temperature which is equal to or higher than the Tg of the liquid crystal material, in order to enhance the efficiency of the curing sufficiently.

The liquid crystal layer produced through the above-described processes becomes a sufficiently solid and strong film. More specifically, since the three-dimensional bond of the mesogen portion is achieved by the curing reaction, the liquid crystal layer is significantly improved not only in heat-resistance (the upper limit temperature at which the liquid crystal phase is maintained) but also in mechanical strength such as resistance to scratch, wear, and cracking compared with that before being cured.

In the case where there arise problems that the alignment substrate to be used is not optically isotropic, the resulting liquid crystal film is opaque at a wavelength region where it is intended to be used, or the alignment substrate is so thick that it causes a problem in practical use, the liquid crystal layer may be transferred to a stretched film having a retardation function. The transferring method may be any conventional method. For example, as disclosed in Japanese Patent Laid-Open Publication Nos. 4-57017 and 5-333313, a method may be used in which after a substrate film different from the alignment substrate, for transferring is laminated via a tacky adhesive or adhesive over a liquid crystal layer on the alignment substrate and if necessary a tacky adhesive or adhesive is coated over the other surface, on which the liquid crystal film layer is not laminated, of the substrate film for transferring and then cured, only the liquid crystal film is transferred on the substrate film for transferring by releasing the alignment substrate.

No particular limitation is imposed on the tacky adhesive or adhesive to be used for transferring the liquid crystal film as long as it is of optical grade. Therefore, conventional acrylic-, epoxy-, or urethane-based adhesives may be used.

The homeotropic alignment liquid crystal film produced as described above can be quantified by measuring the optical retardation at an angle wherein the liquid crystal film is tilted from a vertical incidence. The optical retardation value of the homeotropic alignment liquid crystal film is in contrast with respect to the vertical incidence. There may be used various methods for the optical retardation measurement. For example, an automated birefringence measuring device (manufactured by Oji Scientific Instruments) and a polarization microscope may be used. The homeotropic alignment liquid crystal film looks black between crossed nicols polarizers. In this manner, homeotropic alignability was evaluated.

The homeotropically-aligned liquid crystal film used in the present invention is characterized in that when the thickness thereof is defined as d2, the main refractive indices in the plane of the film are defined as nx2 and ny2, the main refractive index in the thickness direction is defined as nz2, and nz2>nx2≧ny2, the retardation value in the plane (Re2=(nx2−ny2)×d2 [nm]) and the retardation value in the thickness direction (Rth2={(nx2+ny2)/2−nz2}×d2 [nm]) satisfy the following formulas [4] and [5], respectively:

$$0 \leq Re2 \leq 20 \quad [4]$$

$$-500 \leq Rth2 \leq -30. \quad [5]$$

The Re2 and Rth2 values which are optical parameters of the homeotropically-aligned liquid crystal layer can not be determined with certainty because they depend on the display mode of the liquid crystal display device and various optical parameters. However, with respect to a monochromic light of 550 nm, the retardation value (Re2) in the homeotropic alignment liquid crystal film plane is adjusted to usually from 0 nm to 20 nm, preferably from 0 nm to 10 nm, more preferably from 0 nm to 5 nm and the retardation value (Rth2) in the thickness direction is adjusted to usually from −500 to −30 nm, preferably −400 to −50 nm, more preferably from −400 to −100 nm.

Adjustment of the Re2 and Rth2 values within the above ranges results in a viewing angle improvement film for a liquid crystal display device which can widen the viewing angle while compensating the color tone of the images. When the Re2 value is larger than 20 nm, the front characteristics of the liquid crystal display device would be degraded due to the large front retardation value. When the Rth2 value is larger than −30 nm or smaller than −500 nm, sufficient viewing angle improving effect may not be attained or unnecessary coloration may occur when viewing the device obliquely.

Next, the fifth optically anisotropic layer will be described.

No particular limitation is imposed on the fifth optically anisotropic layer. Examples of non-liquid crystalline materials that can be used for forming the fifth optically anisotropic layer include triacetyl cellulose, cyclic polyolefins such as ZEONEX and ZEONOR (both manufactured by ZEON CORPORATION) and ARTON (manufactured by JSR Corporation), other polyolefins such as polypropylene, and polymers such as polyamides, polyimides, polyesters, polyetherketones, polyaryletherketones, polyamideimides, and polyesterimides because of their excellent heat resistance, chemical resistance, transparency, and rigidity. These polymers may be used alone or in combination. Alternatively, these polymers may be used in the form of a mixture of two or more of these polymers having different functional groups from each other, such as polyaryletherketone and polyamide. Among these polymers, particularly preferred are polyimides because of their high transparency and alignability. Examples of materials comprising liquid crystalline compounds include cholesterically-aligned film formed from liquid crystal materials such as cholesteric liquid crystal polymers and cholesterically aligned layers of liquid crystal materials supported on a film.

In order to compensate the viewing angle of the vertical alignment type liquid crystal layer of a vertical alignment type liquid crystal cell, the fifth optically anisotropic layers satisfy the following formulas [13] and [14] when the thicknesses of the fifth optically anisotropic layers is defined as d5, the main refractive indices in the planes are defined as nx5 and ny5, respectively, the main refractive indices in the thickness directions is defined as nz5, nx5≧ny5>nz5, and the retardation values in the planes with respect to a light of a wavelength of 550 nm are defined as (Re5=(nx5−ny5)×d5 [nm] and Rth5={(nx5+ny5)/2−nz5}×d5 [nm]:

$$0 \leq Re5 \leq 20 \quad [13]$$

$$100 \leq Rth5 \leq 400. \quad [14]$$

The retardation value (Re5) in the plane of the fifth optically anisotropic layer can not be determined with certainty because they depend on the optical thickness of a vertical alignment type liquid crystal cell or the birefringence Δn of a liquid crystal material used therein. However, the retardation value (Re5) is usually from 0 to 20 nm, preferably from 0 to 10 nm, more preferably from 0 to 5 nm. If the Re5 value deviates from these ranges, the contrast when viewed from the front would be decreased. The retardation value (Rth5) in the thickness direction of the fifth optically anisotropic layer is usually from 100 to 400 nm, preferably from 180 to 360 nm, more preferably from 200 to 300 nm. If the value deviates these ranges, sufficient viewing angle improving effect may not be attained or unnecessary coloration may occur when viewing the device obliquely.

The polarizer used in the present invention is usually a polarizer having a protection film on one or both surface thereof. When a polarizer having a protection film only on one side thereof is used, the above-described first optically anisotropic layer functions as a protection film as well. The elliptical polarizer of the present invention comprises the first optically anisotropic layer and the first polarizer laminated so that the slow axis of the former is perpendicular to the absorption axis of the latter and can be produced by combining the polarizer and optically anisotropic layer by a roll-to-roll process using a negative biaxial optically anisotropic layer stretched transversely.

No particular limitation is imposed on the polarizer. Therefore, various polarizers may be used. Examples of the polarizer include those produced by stretching uniaxially a hydrophilic polymer film such as a polyvinyl alcohol-based film, a partially formalized polyvinyl alcohol-based film or an ethylene-vinyl acetate copolymer-based partially saponified film to which a dichroic substance such as iodine or a dichroic dye is allowed to absorb; and polyene-based alignment films such as dehydrated products of polyvinyl alcohol and dehydrochlorinated products of polyvinyl chloride. Among these polarizers, it is suitable to use those produced by stretching and aligning a polyvinyl alcohol-based film to which a dichroic substance (iodine or dye) is allowed to absorb. No particular limitation is imposed on the thickness of the polarizer. It is, however, common to use a polarizer with a thickness of 5 to 80 µm.

The polarizer wherein a polyvinyl alcohol is dyed with iodine and uniaxially stretched may be produced by dipping a polyvinyl alcohol in an aqueous solution of iodine to be dyed and stretching it 3 to 7 times longer than the original length. If necessary, the polyvinyl alcohol-based film may be dipped in a solution of boric acid or potassium iodide. Further if necessary, the polyvinyl alcohol-based film may be dipped in water to be washed before dyeing. Washing of the polyvinyl alcohol-based film can remove stains thereon and a blocking inhibitor and swells the film thereby providing an effect to prevent uneven dyeing. Stretching may be carried out after or while dyeing with iodine or followed by dyeing with iodine. Alternatively, stretching may be carried out in an aqueous solution of boric acid or iodine or a water bath.

The protection film to be arranged on one or both surfaces of the polarizer are preferably excellent in transparency, mechanical strength, thermal stability, moisture shielding capability, and isotropy. Examples of materials of the protection film include polyester-based polymers such as polyethylene terephthalate and polyethylene naphthalate; cellulose-based polymers such as diacetyl cellulose and triacetyl cellulose; acryl-based polymers such as polymethyl methacrylate; styrene-based polymers such as polystyrene and acrylonitrile styrene copolymers (AS resin); and polycarbonate-based polymers. Another examples include polyolefin-based polymers such as polyethylene-, polypropylene- and cycloolefin-based polyolefins, polyolefins having a norbornene structure, and ethylene propylene copolymers; vinyl chloride-based polymers; amide-based polymers such as nylon and aromatic polyamides; imide-based polymers; sulfone-based polymers; polyether sulfone-based polymers; polyetheretherketone-based polymers; polyphenylene sulfide-based polymers; vinyl alcohol-based polymers; vinylidene chloride-based polymers; vinyl butyral-based polymers; arylate-based polymers; polyoxymethylene-based polymers; epoxy-based polymers; and blends of these polymers. Another examples include those produced by forming acryl-, urethane-, acrylurethane-, epoxy-, and silicone-based thermal or ultraviolet curing type resins, into film shapes. The thickness of the protection film is generally 500 µm or less, preferably from 1 to 300 µm, particularly preferably from 5 to 200 µm.

The protective film is preferably a substrate that is optically isotropic. Examples of such a substrate include triacetyl cellulose (TAC) films such as Fujitac (manufactured by Fuji Photo Film Co., Ltd.) and Konicatac (manufactured by Konica Minolta Opto, Inc.); cycloolefin-based polymers such as Art on film (manufactured by JSR), ZEONOR film and Zeonex film (both manufactured by Zeon Corp.); TPX film (manufactured by Mitsui Chemical Inc.); and Acryplene film (manufactured by Mitsubishi Rayon Co., Ltd.). Triacetyl cellulose and cycloolefin-based polymers are preferably used in view of flatness, heat resistance or humidity resistance when they are used for an elliptical polarizer.

When the protection film is arranged on both surfaces of the polarizer, the protection film on the top surface may be formed with the same or different polymer of the protection film on the bottom surface. The polarizer is attached to the protection film via a water-based tacky adhesive. Examples of the water-based tacky adhesive include polyvinyl alcohol-based adhesives, gelatin-based adhesives, vinyl-based latex, water-based polyurethanes, and water-based polyesters.

The protection film may be subjected to hard coat or anti-reflection treatment or various treatments for the purposes of anti-sticking, diffusion, or anti-glare.

The hard coat treatment is carried out for preventing scratching on the polarizing film surfaces by forming a curable film with excellent hardness or slipping characteristics, with a suitable acryl- or silicone-based ultraviolet curing resin, on the protection film surface. The anti-reflection treatment is carried out for preventing external light from reflecting on a polarizing film surface and may be achieved by forming an anti-reflection film in accordance with a conventional manner. The anti-sticking treatment is carried out to prevent adhesion between the adjacent layers.

The anti-glare treatment is carried out for preventing the inhibition of visibility of a light transmitting through the polarizing film caused by the reflection of the natural light on a polarizing film surface, by forming fine irregularities on a protection film surface by roughing such as sand blasting or embossing or by blending transparent fine particles. Examples of the fine particles to be blended for forming the fine irregularity on the protection film surface include transparent fine particles, for example, inorganic fine particles of an average particle diameter of 0.5 to 50 µm, which may be electrically conductive, such as silica, alumina, titania, zirconia, tin oxide, indium oxide, cadmium oxide, and antimony oxide and organic fine particles such as cross-linked or uncross-linked polymers. When the fine irregularity is formed on the protection film surface, the amount of the fine particles is usually from 2 to 50 parts by weight, preferably from 5 to 25 parts by weight, on the basis of 100 parts by weight of the transparent resin forming the fine surface irregularity. The anti-glare layer may also be a diffusion layer (having a function of enlarging the viewing angle) for enlarging the light transmitting through the polarizing film and thus enlarging the viewing angle.

The anti-reflection layer, anti-sticking layer, diffusion layer and anti-glare layer may be formed integrally on the protection film or may be formed as an additional optical layer separately from the transparent protection layer.

The first, second, third, fourth, and fifth optically anisotropic layers and the polarizer may be attached to each other via a tacky adhesive layer. No particular limitation is imposed on a tacky adhesive forming the tacky adhesive layer. Any tacky adhesive may be used which is appropriately selected from those containing a polymer such as an acrylic polymer, a silicone-based polymer, a polyester, a polyurethane, a polyamide, a polyether, a fluorine- or rubber-based polymer as a base polymer. In particular, it is preferable to use a tacky adhesive such as an acrylic tacky adhesive which is excellent in optical transparency and in weather resistance and heat resistance and exhibits tackiness characteristics such as moderate wetness, cohesivity and adhesivity.

The formation of the tacky adhesive layer may be carried out by any suitable method. A method is exemplified, wherein a base polymer or a composition thereof is dissolved or dispersed in a solvent containing toluene or ethyl acetate alone or in combination thereby obtaining a tacky adhesive solution containing 10 to 40 percent by mass of the adhesive, which solution is then directly laid over the above-described substrate or liquid crystal film by an appropriate developing method such as casting or coating or alternatively wherein a tacky adhesive layer is formed in accordance with the method as described above on a separator and then transferred onto the liquid crystal layer. The tacky adhesive layer may contain additives such as natural or synthetic resins, in particular fillers or pigments containing tackiness-imparting resins, glass fibers, glass beads, metal powders, and other inorganic powders, dyes, anti-oxidants. The tacky adhesive layer may contain fine particles so as to exhibit light diffusivity.

When each of the optically anisotropic layers are attached to other optically anisotropic layer via a tacky adhesive layer, they may be subjected to a surface treatment so as to enhance the adhesion to the tacky adhesive layer. No particular limitation is imposed on the method of the surface treatment. A surface treatment such as corona discharge, sputtering, low-pressure UV irradiation, or plasma treatment, which can maintain the transparency of the liquid crystal film surface may be suitably used. Among these surface treatments, corona discharge treatment is excellent.

EXAMPLES

The present invention will be further described in the following examples, but the present invention should not be construed as being limited thereto.

The analyzing methods used in the examples are as follows.

(1) $^1$H-NMR Measurement

A compound was dissolved in deuterated chloroform and was determined by means of $^1$H-NMR at 400 MHz (INOVA-400 manufactured by Varinat Co., Ltd.).

(2) GPC Measurement

The GPC measurement was carried out by dissolving a compound in tetrahydrofuran, using 8020 GPC system manufactured by TOSOH CORPORATION equipped with TSK-GEL, Super H1000, Super H2000, Super H3000, and Super H4000 which are connected in series and tetrahydrofuran as an eluent solvent. Polystyrene was used as a standard for calibration of the molecular weight.

(3) Observation Through Microscope

A liquid crystal aligned state was observed using an Olympus BH2 polarizing microscope.

(4) Measurement of Film Thickness

Measurement of a film thickness was carried out using SURFACE TEXTURE ANALYSIS SYSTEM Dektak 3030ST manufactured by SLOAN Co. A method was also used in which the film thickness was determined by interference measurement ("Ultraviolet Visible Near-Infrared Spectrophotometer V-570" available from JASCO Corporation) and refractive index data.

(5) Parameter Measurement of Liquid Crystal Film

The measurement was carried out using an automatic birefringence analyzer KOBRA21ADH manufactured by Oji Scientific Instruments.

Reference Example 1

(Production of Polarizer)

A polyvinyl alcohol film was immersed in hot water to be allowed to expand and then dyed in a iodine/potassium iodide solution and uniaxially stretched in a boric acid aqueous solution thereby producing a polarizer with a spectrophotometer. As the result of examination of the single transmittance, parallel transmittance, and crossed transmittance of the polarizer, the transmittance and polarizing efficiency were found to be 43.5% and 99.9%, respectively.

Reference Example 2

A liquid crystalline polymer represented by formula (8) below was synthesized. With regard to the molecular weight in terms of polystyrene, Mn=8000 and Mw=15000. The representation in formula (8) indicates the structural ratio of the monomers but does not mean a block copolymer.

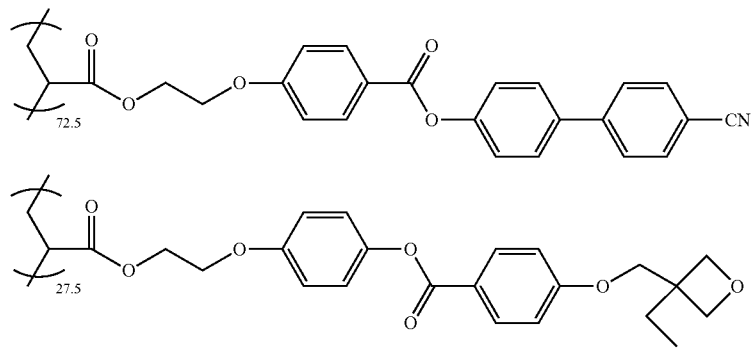

(8)

In 9 ml of cyclohexanone was dissolved 1.0 g of the polymer of formula (8), followed by addition of 0.1 g of a propylene carbonate solution of 50 percent of triarylsulfonium hexafluoroantimonate (a reagent manufactured by Aldrich Co.) at a dark place and filtration of insolubles with a polytetrafluoroethylene filter with a pore size of 0.45 μm thereby producing a liquid crystal material solution.

An alignment substrate was prepared as follows. A polyethylene naphthalate film with a thickness of 38 μm (manufactured by TEIJIN LIMITED) was cut into a size of 15 cm square and spin-coated with a solution of 5 percent by mass of an alkyl-modified polyvinyl alcohol (PVA: MP-203 manufactured by KURARAY CO., LTD.) (solvent was a mixed solvent of water and isopropyl alcohol at a mass ratio of 1:1). The coated film was dried on a hot plate kept at 50° C. for 30 minutes and heated at 120° C. in an oven for 10 minutes. The PVA layer was rubbed with a rayon cloth. The thickness of the resulting PVA layer was 1.2 μm. The rubbing peripheral velocity ratio (the moving velocity of the rubbing cloth/the moving velocity of the substrate film) was set to 4.

On the resulting alignment substrate was spin-coated the liquid crystal material solution produced above. The coated alignment substrate was dried on a hot plate kept at 60° C. for 10 minutes and heated at 150° C. in an oven for 2 minutes thereby aligning the liquid crystal material. The substrate was placed on an aluminum plate heated at 60° C., making contact therewith and irradiated with an ultraviolet light of 600 mJ/cm$^2$ (measured at 365 nm) using a high pressure mercury lamp thereby curing the liquid crystal material.

Since the polyethylene naphthalate film used as a substrate was large in birefringence and thus not preferable for an optical film, the resulting liquid crystal film on the alignment substrate was transferred via an ultraviolet curing type adhesive onto a triacetylcellulose (TAC) film. More specifically, the adhesive with a thickness of 5 μm was coated over the cured liquid crystal material layer on the polyethylene naphthalate film and laminated with a TAC film. After the laminate was subjected to an irradiation of ultraviolet light from the TAC film side so as to cure the adhesive, the polyethylene naphthalate film and PVA layer were released.

As the result of observation of the resulting optical film (liquid crystal layer/adhesive layer/TAC film) through a polarizing microscope, it was confirmed that the film was aligned in a monodomain uniform aligned state having no disclination. As the result of observation of the optical film through a conoscope, it was confirmed that the alignment was a homeotropic alignment having a positive uniaxial refraction structure. As the result of measurement using KOBRA21ADH, the combination of the TAC film and the liquid crystal layer was found to have a retardation in the plane direction of 0.5 nm and a retardation in the thickness direction of −195 nm. The TAC film itself had a negative uniaxiality and a retardation in the plane of 0.5 nm and a retardation in the thickness direction of +35 nm. Therefore, it was assessed that the liquid crystal layer itself had a retardation Re of 0 nm and a retardation Rth of −230 nm. In Example 1 and the following examples thereof, when the optical film was attached to other members, the TAC film was removed and only the homeotropically-aligned liquid crystal layer was used. The thickness of the homeotropically-aligned liquid crystal layer was 1.3 μm.

The above-described homeotropically-aligned liquid crystal layer corresponds to the second optically anisotropic layer.

Example 1

The configuration of an elliptical polarizer will be described with reference to FIG. 1.

A transparent protection layer is formed by adhering a triacetyl cellulose (TAC) film 2 with a thickness of 40 μm, a front retardation of 6 nm, and a thickness retardation of 60 nm on one surface of the polarizer produced in Reference Example 1 via a polyvinyl alcohol-based adhesive. A first optically anisotropic layer 3 (ZEONOR manufactured by ZEON CORPORATION) having the slow axis in the roll width direction produced by transverse uniaxial stretching was adhered on the other side of the polarizer having the absorption axis in the roll longitudinal direction by roll-to-roll lamination via a polyvinyl alcohol-based adhesive so that the absorption axis is perpendicular to the slow axis. On the first optically anisotropic layer 3 was laminated the second optically anisotropic layer 4 produced in Reference Example 2 via an acrylic tacky adhesive. On the second optically anisotropic layer 4 was laminated a third optically anisotropic layer 5 (ZEONOR manufactured by ZEON CORPORATION) via an acrylic tacky adhesive thereby producing an elliptical polarizer. The resulting elliptical polarizer had a thickness of 231 μm. The retardations Re1 and Rth1 of the first optically anisotropic layer 3 were 100 nm and 90 nm, respectively. The retardations Re3 and Rth3 of the third optically anisotropic layer 5 were 137.5 nm and 210 nm, respectively.

Example 2

The vertical alignment type liquid crystal display device of Example 2 will be described with reference to FIGS. 2 and 3.

A transparent electrode 8 formed of an ITO layer with high transmissivity was formed on a substrate 7, and a counter electrode 10 was formed on a substrate 9. Between the transparent electrode 8 and the counter electrode 10 was sandwiched a liquid crystal layer 11 formed of a liquid crystal material exhibiting a negative dielectric anisotropy.

On the contacting surfaces between the liquid crystal layer 11 and the transparent electrode 8 and the counter electrode 10 were formed alignment layers with vertical alignability (not shown), at least one of which had been subjected to an aligning treatment such as rubbing after being coated.

The liquid crystal molecules in the liquid crystal layer 11 had a tilt angle of 1 degree with respect to the vertical direction of the substrate surfaces due to the alignment treatment such as rubbing on the alignment layer.

Because of the use of the liquid crystal material exhibiting a negative dielectric anisotropy for the liquid crystal layer 11, the liquid crystal molecules tilted toward the parallel direction with respect to the substrate surfaces upon application of an electric voltage between the transparent electrode 8 and the counter electrode 10.

As the liquid crystal material for the liquid crystal layer 11 was used a liquid crystal material having a refractive index anisotropy wherein Ne (refractive index to extraordinary light)=1.561, No (refractive index to ordinary light)=1.478, and ΔN(Ne−No)=0.083, and the cell gap was 4.7 μm.

The elliptical polarizer produced in Example 1 was arranged on the display side (upper side of the drawing) of the vertical alignment type liquid crystal cell 12. A linear polarizer 13 (thickness: about 105 μm, SQW-062 manufactured by Sumitomo Chemical Co., Ltd.) was arranged below the rear side (lower side of the drawing) of the vertical alignment type liquid crystal cell 12. Between the lower linear polarizer 13 and the liquid crystal cell 12 was arranged a fourth optically anisotropic layer 14 (ZEONOR manufactured by ZEON CORPORATION). The Rth of triacetyl cellulose used as the supporting substrate of the linear polarizer (SQW-062 manufactured by Sumitomo Chemical Co., Ltd.) was 35 nm.

The absorption axis orientations of the polarizer 1 and the linear polarizer 13 were set to 90 degrees and 0 degree in the plane, respectively, as indicated by arrows in FIG. 3. The first optically anisotropic layer 3 was formed of an optical element having an optical axis in the plane and a negative biaxial optical anisotropy. The slow axis orientation of the first optically anisotropic layer 3 was set to 0 degree, as indicated by an arrow in FIG. 3, and the layer 3 had a retardation in the plane Re1 of 100 nm and a retardation in the thickness direction Rth1 of 90 nm.

The third and fourth optically anisotropic layers 5, 14 were each formed of an optical element having an optical axis in the plane and a negative biaxial optical anisotropy. The slow axis orientations of the third and fourth optically anisotropic layers 5, 14 were set to 45 degrees and 135 degrees, respectively, as indicated by arrows in FIG. 3, and the layers 5, 14 had retardations Re3, Re4 of 137.5 nm and retardations Rth3, Rth4 of 210 nm.

The second optically anisotropic layer 4 formed of the homeotropically-aligned liquid crystal film had a retardation Re2 of 0 nm and a retardation Rth2 of −230 nm.

FIG. 4 shows the contrast ratio from all the directions defined by the transmissivity ratio of black image 0V and white image 5V "(white image)/(black image)". The contrast contour lines indicate 500, 200, 100 and 50 from the innermost. The concentric circles indicate angles of an interval of 10 degrees from the center. Therefore, the outermost circle indicates 80 degrees (the same is applied to the subsequent drawings).

Example 3

The vertical alignment type liquid crystal display device of Example 3 will be described with reference to FIGS. 5 and 6.

A vertical alignment type liquid crystal display device was produced in accordance with the procedures of Example 2 except that a fifth optically anisotropic layer 15 (ARTON manufactured by JSR) was arranged between the vertical alignment type liquid crystal cell 12 and fourth optically anisotropic layer 14 of Example 2 and the retardations Re3 and Re4 and Rth3 and Rth4 of the third and fourth optically anisotropic layers 5, 14 were changed to 137.5 nm and 145 nm. The fifth optically anisotropic layer 15 had a retardation Re5 of 0 and a retardation Rth5 of 120 nm.

FIG. 7 shows the contrast ratio from all the directions defined by the transmissivity ratio of black image 0V and white image 5V "(white image)/(black image)".

Example 4

A transflective vertical alignment type liquid crystal display device was produced in accordance with the procedures of Example 2 except that a transflective vertical alignment type liquid crystal display device described below was produced.

The transflective vertical alignment type liquid crystal display device will be described with reference to FIGS. 8 and 9.

A reflective electrode 16 formed of an Al layer with high reflectivity and a transparent electrode 8 formed of an ITO layer with high transmissivity were formed on a substrate 7, and a counter electrode 10 was formed on a substrate 9. Between the reflective and transparent electrodes 16, 8 and the counter electrode 10 was sandwiched a liquid crystal layer 11 formed of a liquid crystal material exhibiting a negative dielectric anisotropy.

On the contacting surfaces between the liquid crystal layer 11 and the reflective and transparent electrodes 16, 8 and the counter electrode 10 were formed alignment layers with vertical alignability (not shown), at least one of which had been subjected to an aligning treatment such as rubbing after being coated.

The liquid crystal molecules in the liquid crystal layer 11 had a tilt angle of 1 degree with respect to the vertical direction of the substrate surfaces due to the alignment treatment such as rubbing on the alignment layer with vertical alignability.

Because of the use of the liquid crystal material exhibiting a negative dielectric anisotropy for the liquid crystal layer 11, the liquid crystal molecules tilted toward the parallel direction with respect to the substrate surfaces upon application of an electric voltage between the reflective and transparent electrodes 16, 8 and the counter electrode 10.

As the liquid crystal material for the liquid crystal layer 11 was used the same material as that used in Example 2. The cell gaps at the reflective electrode part and at the transparent electrode part were 2.4 μm and 4.7 μm, respectively.

The slow axis orientations of the third and fourth optically anisotropic layers 5, 14 were set to 45 degrees and 135 degrees, respectively. The third and fourth optically anisotropic layers 5, 14 had retardations Re3, Re4 of 137.5 nm and retardations Rth3, Rth4 of 210 nm, respectively, that are the same as those in Example 2.

FIG. 10 shows the contrast ratio from all the directions defined by the transmissivity ratio of black image 0V and white image 5V "(white image)/(black image)".

Comparative Example 1

The vertical alignment type liquid crystal display device used in Comparative Example 1 will be described with reference to FIGS. 11 and 12. A linear polarizer 20 (thickness: about 105 μm, SQW-062 manufactured by Sumitomo Chemical Co., Ltd.) was arranged above the displaying side (upper side of the drawing) of the vertical alignment type liquid crystal cell 12 that was the same as the cell used in Example 2. Between the upper linear polarizer 20 and the liquid crystal cell 12 were arranged a positive uniaxial optically anisotropic layer 18 (ZEONOR manufactured by ZEON CORPORATION) produced by longitudinal uniaxial stretching, a second optically anisotropic layer 4 formed of the homeotropically-alignment liquid crystal film produced in Reference Example 2, and a third optically anisotropic layer 5 (ZEONOR manufactured by ZEON CORPORATION). A linear polarizer 13 (thickness: about 105 μm, SQW-062 manufactured by Sumitomo Chemical Co., Ltd.) was arranged below the rear side (lower side of the drawing) of the vertical alignment type liquid crystal cell 12. Between the lower linear polarizer 13 and the liquid crystal cell 12 was arranged a fourth optically anisotropic layer 14 (ZEONOR manufactured by ZEON CORPORATION). The Rth of the triacetyl cellulose used as the supporting substrate of the linear polarizer (SQW-062 manufactured by Sumitomo Chemical Co., Ltd.) was 35 nm. The thickness of the elliptical polarizer arranged above the display side of the vertical alignment type liquid crystal cell 12 was 286 μm.

The absorption axis orientations of the polarizer 1 and linear polarizers 13 were set to 90 degrees and 0 degree in the plane, respectively, as indicated by arrows in FIG. 12. The positive uniaxial optically anisotropic layer 18 was formed of an optical element having an optical axis in the plane and a positive uniaxial optical anisotropy. The slow axis orientation of the positive uniaxial optically anisotropic layer 18 was set to 0 degree, as indicated by an arrow in FIG. 12, and the layer 18 had a plane retardation Re of 120 nm and a thickness retardation Rth of 60 nm.

The third and fourth optically anisotropic layers 5, 14 were each formed of an optical element having an optical axis in the plane and a negative biaxial optical anisotropy. The slow axis orientations of the third and fourth optically anisotropic layers 5, 14 were set to 45 degrees and 135 degrees, respectively, as indicated by arrows in FIG. 12, and the layers 5, 14 had retardations Re3, Re4 of 137.5 nm and retardations Rth3, Rth4 of 210 nm.

The second optically anisotropic layer 4 formed of the homeotropically-aligned liquid crystal film had a retardation Re2 of 0 nm and a retardation Rth2 of −230 nm.

FIG. 13 shows the contrast ratio from all the directions defined by the transmissivity ratio of black image 0V and white image 5V "(white image)/(black image)".

As the result of comparison between the contrast contours in the all direction shown in FIGS. 4 and 7 and those in FIG. 13, it was found that substantially equal viewing angle characteristics were obtained.

However, comparing with the elliptical polarizer (thickness: 231 μm) produced in Example 1, the whole thickness of the laminate arranged above the vertical alignment type liquid crystal cell 12 in FIG. 11 was 286 μm and thus thicker than the elliptical polarizer. This is because the positive uniaxial anisotropic layer 18 produced by uniaxial longitudinal stretching can not be laminated with the polarizer by a roll-to-roll method so that the absorption axis of the polarizer is perpendicular to the slow axis of the positive uniaxial anisotropic layer 18 and thus the laminate became thicker by the thickness of the transparent protection layer 19 arranged between the polarizer and the positive uniaxial anisotropic layer to protect the polarizer.

INDUSTRIAL APPLICABILITY

The present invention provides an inexpensive elliptical polarizer with excellent viewing angle characteristics and a vertical alignment type liquid crystal display device using the elliptical polarizer.

DESCRIPTION OF NUMERALS

1: polarizer, 2: transparent protection layer, 3: first optically anisotropic layer, 4: second optically anisotropic layer, 5: third optically anisotropic layer, 6: elliptical polarizer, 7: substrate, 8: transparent electrode, 9: substrate, 10: counter electrode, 11: liquid crystal layer (vertically aligned), 12: vertical alignment type liquid crystal cell, 13: linear polarizer, 14: fourth optically anisotropic layer, 15: fifth optically anisotropic layer, 16: reflective electrode, 17: transflective vertical alignment type liquid crystal cell, 18: positive uniaxial optically anisotropic layer, 19: transparent protection layer, 20: linear polarizer

The invention claimed is:

1. An elliptical polarizer comprising at least a first polarizer, a first optically anisotropic layer, a second optically anisotropic layer, and a third optically anisotropic layer, laminated in this order, wherein the first optically anisotropic layer satisfies the following requirements [1] to [3]:

$$50 \leq Re1 \leq 500 \quad [1]$$

$$30 \leq Rth1 \leq 750 \quad [2]$$

$$0.6 \leq Rth1/Re1 \leq 1.5 \quad [3]$$

wherein Re1 and Rth1 denote the retardation values in the plane and thickness direction of the first optically anisotropic layer, respectively and are defined as $Re1=(nx1-ny1) \times d1$ [nm] and $Rth1=\{(nx1+ny1)/2-nz1\} \times d1$ [nm], respectively wherein d1 indicates the thickness of the first optically anisotropic layer, nx1 and ny1 indicate the main refractive indices in the plane of the first optically anisotropic layer with respect to a light of a wavelength of 550 nm, nz1 indicates the main refractive index in the thickness direction of the first optically anisotropic layer with respect to a light of a wavelength of 550 nm, and $nx1 > ny1 \geq nz1$;

the second optically anisotropic layer satisfies the following requirements [4] and [5]:

$$0 \leq Re2 \leq 20 \quad [4]$$

$$-500 \leq Rth2 \leq -30 \quad [5]$$

wherein Re2 and Rth2 denote the retardation values in the plane and thickness direction of the second optically anisotropic layer, respectively and are defined as $Re2=(nx2-ny2) \times d2$ [nm] and $Rth2=\{(nx2+ny2)/2-nz2\} \times d2$ [nm], respectively wherein d2 indicates the thickness of the second optically anisotropic layer, nx2 and ny2 indicate the main refractive indices in the plane of the second optically anisotropic layer with respect to a light of a wavelength of 550 nm, nz2 indicates the main refractive index in the thickness direction of the second optically anisotropic layer with respect to a light of a wavelength of 550 nm, and $nz2 > nx2 \geq ny2$; and the third optically anisotropic layer satisfies the following requirements [6] to [8]:

$$100 \leq Re3 \leq 180 \quad [6]$$

$$50 \leq Rth3 \leq 600 \quad [7]$$

$$0.5 \leq Rth3/Re3 \leq 3.5 \quad [8]$$

wherein Re3 and Rth3 denote the retardation values in the plane and thickness direction of the third optically anisotropic layer, respectively and are defined as $Re3=(nx3-ny3) \times d3$ [nm] and $Rth3=\{(nx3+ny3)/2-nz3\} \times d3$ [nm], respectively wherein d3 indicates the thickness of the third optically anisotropic layer, nx3 and ny3 indicate the main refractive indices in the plane of the third optically anisotropic layer with respect to a light of a wavelength of 550 nm, nz3 indicates the main refractive index in the thickness direction of the third optically anisotropic layer with respect to a light of a wavelength of 550 nm, and $nx3 > ny3 \geq nz3$.

2. The elliptical polarizer according to claim 1, wherein the second optically anisotropic layer comprises a homeotropically aligned liquid crystal film produced by aligning and fixing a liquid crystalline composition exhibiting a positive uniaxiality, in a homeotropic alignment while the composition is in the liquid crystal state.

3. The elliptical polarizer according to claim 2, wherein the liquid crystalline composition exhibiting a positive uniaxiality comprises a side chain liquid crystalline polymer having an oxetanyl group.

4. The elliptical polarizer according to claim 1, wherein the first and third optically anisotropic layers each comprise a polycarbonate or a cyclic polyolefin.

5. The elliptical polarizer according to claim 1, wherein the third optically anisotropic layer further satisfies the following requirement [12]:

$$0.7 \leq Re3(450)/Re3(590) \leq 1.05 \quad [12]$$

wherein Re3(450) and Re3(590) indicate the retardation values in the plane of the third optically anisotropic layer with respect to lights of wavelengths of 450 nm and 590 nm, respectively.

6. The elliptical polarizer according to claim 1, wherein when the angle formed by the absorption axis of the first polarizer and the slow axis of the first optically anisotropic layer is defined as "r", the first polarizer and first optically anisotropic layer are laminated so as to satisfy $80° \leq r \leq 100°$.

7. The elliptical polarizer according to claim 1, wherein when the angle formed by the absorption axis of the first polarizer and the slow axis of the third optically anisotropic layer is defined as "p", p satisfies $40° \leq p \leq 50°$.

8. The elliptical polarizer according to claim 1, wherein the first optically anisotropic layer also acts as a protection layer for the first polarizer.

9. A vertical alignment type liquid crystal display device comprising at least a first polarizer, a first optically anisotropic layer, a second optically anisotropic layer, a third optically anisotropic layer, a vertical alignment type liquid crystal cell comprising a pair of substrates each provided with electrodes and liquid crystal molecules disposed therebetween, the liquid crystal molecules being aligned vertically to the substrates when no electric voltage is applied, a fourth optically anisotropic layer, and a second polarizer, arranged in this order, wherein the first optically anisotropic layer satisfies the following requirements [1] to [3]:

$$50 \leq Re1 \leq 500 \quad [1]$$

$$30 \leq Rth1 \leq 750 \quad [2]$$

$$0.6 \leq Rth1/Re1 \leq 1.5 \quad [3]$$

wherein Re1 and Rth1 denote the retardation values in the plane and thickness direction of the first optically anisotropic layer, respectively and are defined as Re1=(nx1−ny1)×d1 [nm] and Rth1={(nx1+ny1)/2−nz1}×d1 [nm], respectively wherein d1 indicates the thickness of the first optically anisotropic layer, nx1 and ny1 indicate the main refractive indices in the plane of the first optically anisotropic layer with respect to a light of a wavelength of 550 nm, nz1 indicates the main refractive index in the thickness direction of the first optically anisotropic layer with respect to a light of a wavelength of 550 nm, and nx1>ny1≧nz1;

the second optically anisotropic layer satisfies the following requirements [4] and [5]:

$$0 \leq Re2 \leq 20 \quad [4]$$

$$-500 \leq Rth2 \leq -30 \quad [5]$$

wherein Re2 and Rth2 denote the retardation values in the plane and thickness direction of the second optically anisotropic layer, respectively and are defined as Re2=(nx2−ny2)×d2 [nm] and Rth2={(nx2+ny2)/2−nz2}×d2 [nm], respectively wherein d2 indicates the thickness of the second optically anisotropic layer, nx2 and ny2 indicate the main refractive indices in the plane of the second optically anisotropic layer with respect to a light of a wavelength of 550 nm, nz2 indicates the main refractive index in the thickness direction of the second optically anisotropic layer with respect to a light of a wavelength of 550 nm, and nz2>nx2≧ny2;

the third optically anisotropic layer satisfies the following requirements [6] to [8]:

$$100 \leq Re3 \leq 180 \quad [6]$$

$$50 \leq Rth3 \leq 600 \quad [7]$$

$$0.5 \leq Rth3/Re3 \leq 3.5 \quad [8]$$

wherein Re3 and Rth3 denote the retardation values in the plane and thickness direction of the third optically anisotropic layer, respectively and are defined as Re3=(nx3−ny3)×d3 [nm] and Rth3={(nx3+ny3)/2−nz3}×d3 [nm], respectively wherein d3 indicates the thickness of the third optically anisotropic layer, nx3 and ny3 indicate the main refractive indices in the plane of the third optically anisotropic layer with respect to a light of a wavelength of 550 nm, nz3 indicates the main refractive index in the thickness direction of the third optically anisotropic layer with respect to a light of a wavelength of 550 nm, and nx3>ny3≧nz3; and the fourth optically anisotropic layer satisfies the following requirements [9] to [11]:

$$100 \leq Re4 \leq 180 \quad [9]$$

$$50 \leq Rth4 \leq 600 \quad [10]$$

$$0.5 \leq Rth4/Re4 \leq 3.5 \quad [11]$$

wherein Re4 and Rth4 denote the retardation values in the plane and thickness direction of the fourth optically anisotropic layer, respectively and are defined as Re4=(nx4−ny4)×d4 [nm] and Rth4={(nx4+ny4)/2−nz4}×d4 [nm], respectively wherein d4 indicates the thickness of the fourth optically anisotropic layer, nx4 and ny4 indicate the main refractive indices in the plane of the fourth optically anisotropic layer with respect to a light of a wavelength of 550 nm, nz4 indicates the main refractive index in the thickness direction of the fourth optically anisotropic layer with respect to a light of a wavelength of 550 nm, and nx4>ny4≧nz4.

10. The vertical alignment type liquid crystal display device according to claim 9, further comprising a fifth optically anisotropic layer satisfying the following requirements [13] and [14] arranged between the vertical alignment type liquid crystal cell and the fourth optically anisotropic layer, $$0 \leq Re5 \leq 20 \quad [13]$$

$$100 \leq Rth5 \leq 400 \quad [14]$$

wherein Re5 and Rth5 denote the retardation values in the plane and thickness direction of the fifth optically anisotropic layer, respectively and are defined as Re5=(nx5−ny5)×d5 [nm] and Rth5={(nx5+ny5)/2−nz5}×d5 [nm], respectively wherein d5 indicates the thickness of the fifth optically anisotropic layer, nx5 and ny5 indicate the main refractive indices in the plane of the fifth optically anisotropic layer with respect to a light of a wavelength of 550 nm, nz5 indicates the main refractive index in the thickness direction of the fifth optically anisotropic layer with respect to a light of a wavelength of 550 nm, and nx5≦ny5>nz5.

11. The vertical alignment type liquid crystal display device according to claim 10, wherein the fifth optically anisotropic layer is a layer formed from at least one type of material selected from the group consisting of liquid crystalline compounds, triacetyl cellulose, cyclic polyolefins, polyolefins, polyamides, polyimides, polyesters, polyether ketones, polyarylether ketones, polyamide imides, and polyester imides.

12. The vertical alignment type liquid crystal display device according to claim 9, wherein the second optically anisotropic layer comprises a homeotropically aligned liquid crystal film produced by aligning and fixing a liquid crystalline composition exhibiting a positive uniaxiality, in a homeotropic alignment while the composition is in the liquid crystal state.

13. The vertical alignment type liquid crystal display device according to claim 12, wherein the liquid crystalline composition exhibiting a positive uniaxiality comprises a side chain liquid crystalline polymer having an oxetanyl group.

14. The vertical alignment type liquid crystal display device according to claim 9, wherein the first, third and fourth optically anisotropic layers each comprise a polycarbonate or a cyclic polyolefin.

15. The vertical alignment type liquid crystal display device according to claim 9, wherein the third optically anisotropic layer further satisfies the following requirement [12]:

$$0.7 \leq Re3(450)/Re3(590) \leq 1.05 \qquad [12]$$

wherein Re3(450) and Re3(590) indicate the retardation values in the plane of the third optically anisotropic layer with respect to lights of wavelengths of 450 nm and 590 nm, respectively.

16. The vertical alignment type liquid crystal display device according to claim 9, wherein the fourth optically anisotropic layer further satisfies the following requirement [15]:

$$0.7 \leq Re4(450)/Re4(590) \leq 1.05 \qquad [15]$$

wherein Re4(450) and Re4(590) indicate the retardation values in the plane of the fourth optically anisotropic layer with respect to lights of wavelengths of 450 nm and 590 nm, respectively.

17. The vertical alignment type liquid crystal display device according to claim 9, wherein when the angle formed by the absorption axis of the first polarizer and the slow axis of the first optically anisotropic layer is defined as "r", the first polarizer and third optically anisotropic layer are laminated so as to satisfy $80° \leq r \leq 100°$.

18. The vertical alignment type liquid crystal display device according to claim 9, wherein the third optically anisotropic layer and the fourth optically anisotropic layer are laminated so that their slow axes form an angle of 80° to 100°.

19. The vertical alignment type liquid crystal display device according to claim 9, wherein when the angle formed by the absorption axis of the first polarizer and the slow axis of the third optically anisotropic layer is defined as "p" and the angle formed by the absorption axis of the second polarizer and the slow axis of the fourth optically anisotropic layer is defined as "q", p satisfies $40° \leq p \leq 50°$ and q satisfies $40° \leq q \leq 50°$.

20. The vertical alignment type liquid crystal display device according to claim 9, wherein the first optically anisotropic layer also acts as a protection layer for the first polarizer.

21. The vertical alignment type liquid crystal display device according to claim 9, wherein one of the pair of substrates of the vertical alignment type liquid crystal cell is a substrate having a region with a reflection function and a region with a transmission function.

* * * * *